United States Patent
Yamamoto et al.

(10) Patent No.: US 7,460,943 B2
(45) Date of Patent: Dec. 2, 2008

(54) ELECTRONIC CONTROL UNIT FOR CONTROLLING SEQUENTIAL GEARSHIFT RANGES OF VEHICLES

(75) Inventors: Koji Yamamoto, Toyota (JP); Yasuhiro Kaya, Toyota (JP); Kiyoshiro Ueoka, Nisshin (JP); Kensuke Kamichi, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 51 days.

(21) Appl. No.: 11/352,305

(22) Filed: Feb. 13, 2006

(65) Prior Publication Data
US 2006/0195242 A1 Aug. 31, 2006

(30) Foreign Application Priority Data
Feb. 16, 2005 (JP) ............................. 2005-039126
Aug. 25, 2005 (JP) ............................. 2005-243952

(51) Int. Cl.
*G06F 7/00* (2006.01)
*G06F 17/00* (2006.01)
*F16H 59/00* (2006.01)
*F16H 59/14* (2006.01)
*F16H 59/36* (2006.01)

(52) U.S. Cl. ............................. 701/52; 701/56; 74/335

(58) Field of Classification Search ................ 701/51, 701/52, 53, 54, 56, 58, 60, 61, 64, 66, 70, 701/1, 22, 36, 49; 74/335, 336 R, 336 B, 74/469, 471, 473.1, 473.12, 473.25, 473.3, 74/479.01; 477/120, 129

See application file for complete search history.

(56) References Cited

U.S. PATENT DOCUMENTS

| | | | |
|---|---|---|---|
| 5,890,991 A | | 4/1999 | Sakakiyama |
| 6,033,338 A | * | 3/2000 | Jackson et al. ................ 477/44 |
| 6,272,414 B1 | * | 8/2001 | Takahashi et al. ............. 701/54 |
| 6,377,883 B1 | * | 4/2002 | Shimabukuro et al. ........ 701/51 |
| 6,410,037 B1 | * | 6/2002 | De Bony et al. ............ 424/401 |
| 6,604,039 B2 | * | 8/2003 | Joe et al. ...................... 701/51 |
| 6,662,096 B2 | * | 12/2003 | Komiyama et al. ........... 701/54 |
| 6,823,250 B2 | * | 11/2004 | Yamaguchi et al. .......... 701/51 |
| 2002/0123836 A1 | * | 9/2002 | Komiyama et al. .......... 701/51 |

(Continued)

FOREIGN PATENT DOCUMENTS

EP 0 838 359 B1 11/2002

(Continued)

OTHER PUBLICATIONS

International Search Report, Appln. No. PCT/JP2006/302685 mailed Jun. 8, 2006.

*Primary Examiner*—Jack W Keith
*Assistant Examiner*—Edward Pipala
(74) *Attorney, Agent, or Firm*—Kenyon & Kenyon LLP

(57) ABSTRACT

In response to an upshift of a gearshift position SP in a sequential gearshift range, the drive control of the invention once lowers the rotation speed Ne of an engine. This variation in rotation speed of the engine enables the driver to have adequate gear change feeling, which is similar to the familiar gear change feeling in a conventional motor vehicle equipped with a stepped automatic transmission. Namely the drive control of the invention effectively prevents the driver from feeling something is wrong.

21 Claims, 17 Drawing Sheets

U.S. PATENT DOCUMENTS

| | | | |
|---|---|---|---|
| 2002/0173895 A1* | 11/2002 | Kitaori et al. | 701/51 |
| 2004/0259685 A1* | 12/2004 | Inoue et al. | 477/118 |
| 2005/0256627 A1* | 11/2005 | Sah et al. | 701/70 |

FOREIGN PATENT DOCUMENTS

| | | |
|---|---|---|
| JP | 09-308012 | 11/1997 |
| JP | 2001-099310 | 4/2001 |
| JP | 2002-243031 | 8/2002 |
| JP | 2006-094688 | 4/2006 |
| WO | WO 2005/005188 A1 | 1/2005 |

* cited by examiner

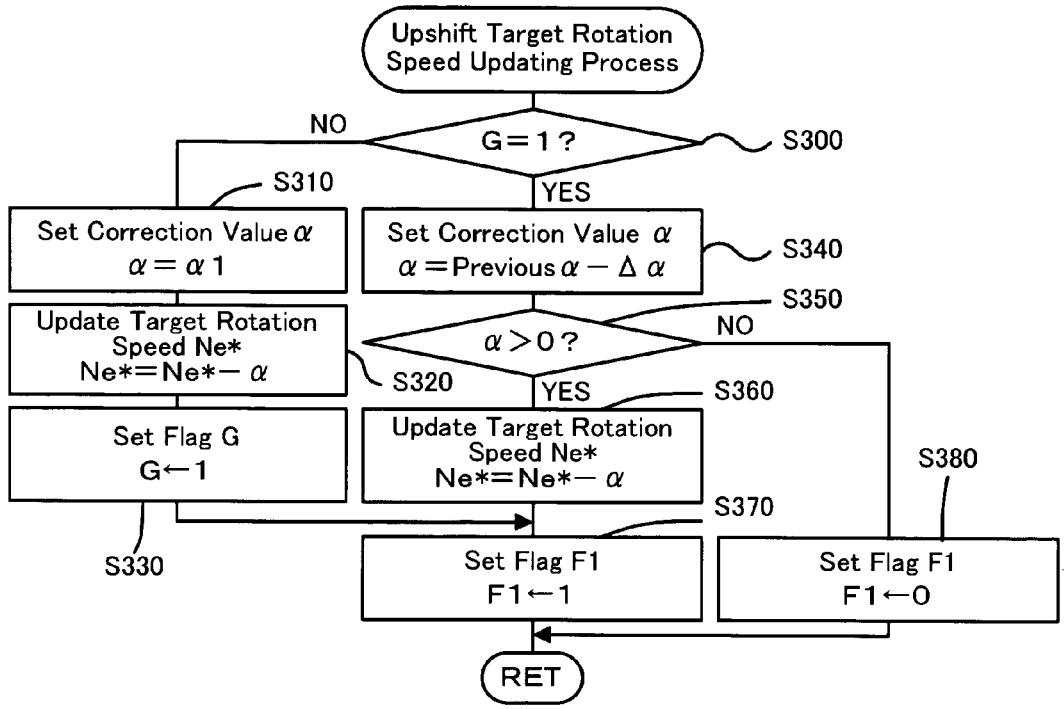
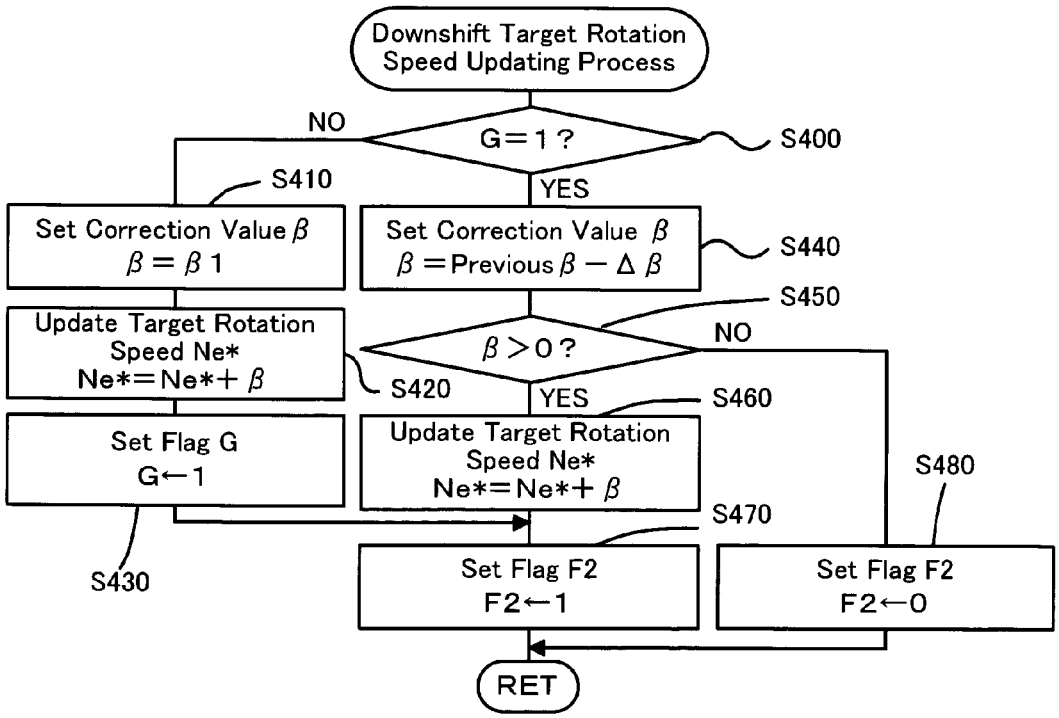

ELECTRONIC CONTROL UNIT FOR CONTROLLING SEQUENTIAL GEARSHIFT RANGES OF VEHICLES

BACKGROUND OF THE INVENTION

1. Field of the Invention

The present invention relates to a motor vehicle and a control method of the motor vehicle.

2. Description of the Prior Art

One proposed structure of a motor vehicle has a planetary gear mechanism connected to an engine, a first motor, and an axle and a second motor connected to the axle (see, for example, Japanese Patent Laid-Open Gazette No. H09-308012). In the motor vehicle of this prior art structure, the power of the engine driven at an efficient drive point is subjected to torque conversion by the planetary gear mechanism and the two motors and is output to the axle to enhance the total energy efficiency of the vehicle.

SUMMARY OF THE INVENTION

In a conventional motor vehicle equipped with a stepped automatic transmission that converts the power of an engine at a selected available speed and outputs the converted power to an axle, the driving conditions of the engine are changed in response to a speed change of the automatic transmission to give the driver adequate gear change feeling. In the motor vehicle of the prior art structure, the engine is driven at an arbitrary drive point regardless of the setting of the gearshift position. The engine may thus be driven with no change of the drive point regardless of a change of the gearshift position. The driver who is familiar with the gear change feeling in the stepped automatic transmission accordingly feels something is wrong.

The motor vehicle and the motor vehicle control method of the invention thus aim to enable the driver to have adequate gear change feeling in response to a change of the gearshift position. The motor vehicle and the motor vehicle control method of the invention also aim to enable the driver to have adequate gear change feeling in response to a change of the gearshift position, while preventing an accumulator unit from being charged or discharged excessively.

At least part of the above and the other related objects is attained by a motor vehicle and a control method of the motor vehicle of the invention having the configurations discussed below.

The present invention is directed to a motor vehicle equipped with an internal combustion engine, a power transmission assembly, and a motor, where the power transmission assembly transmits at least part of output power of the internal combustion engine, which is driven at an arbitrary drive point regardless of a gearshift position, to an axle and the motor is capable of outputting power to the axle. The motor vehicle includes: a driving force demand setting module that sets a driving force demand to be output to the axle; an effective drive point setting module that, in the case of no change of the gearshift position, sets an effective drive point to a specific drive point determined under a preset restriction according to the driving force demand, and in the case of a change of the gearshift position, sets the effective drive point to an updated drive point with at least a change of a rotation speed from the specific drive point determined under the preset restriction according to the driving force demand; and a control module that controls the internal combustion engine, the power transmission assembly, and the motor to drive the internal combustion engine at the set effective drive point and to ensure output of a driving force equivalent to the driving force demand to the axle.

In the case of no change of the gearshift position, the motor vehicle of the invention sets the effective drive point to a specific drive point determined under a preset restriction according to a driving force demand specified as a requirement to be output to the axle and controls the internal combustion engine, the power transmission assembly, and the motor to drive the internal combustion engine at the set effective drive point and to ensure output of a driving force equivalent to the driving force demand to the axle. In the case of a change of the gearshift position, on the other hand, the motor vehicle of the invention sets the effective drive point to an updated drive point with at least a change of the rotation speed from the specific drive point determined under the preset restriction according to the driving force demand and controls the internal combustion engine, the power transmission assembly, and the motor to drive the internal combustion engine at the set effective drive point and to ensure output of the driving force equivalent to the driving force demand to the axle. In response to a change of the gearshift position, the rotation speed of the internal combustion engine is changed to give the driver adequate gear change feeling. The driver naturally feels odd when no gear change feeling is given by the driver's active change of the gearshift position. The change of the rotation speed desirably prevents the driver from feeling something is wrong.

In one preferable embodiment of the invention, the motor vehicle may further include a gearshift position change mechanism that changes the gearshift position according to a driver's depression amount of an accelerator pedal and a vehicle speed. This arrangement desirably gives the driver adequate gear change feeling, which is similar to the familiar feeling in a conventional motor vehicle equipped with a stepped automatic transmission. In this embodiment, the gearshift position change mechanism may change the gearshift position according to the vehicle speed when the driver depresses the accelerator pedal to or over a preset first level.

In another preferable embodiment of the invention, the motor vehicle may further include: a first gearshift position change mechanism that changes the gearshift position by a driver's gearshift position change operation; and a second gearshift position change mechanism that changes the gearshift position according to the driver's depression amount of an accelerator pedal and a vehicle speed regardless of the driver's gearshift position change operation. The effective drive point setting module, in response to a change of the gearshift position by the first gearshift position change mechanism, may set the effective drive point to an updated drive point with at least a change of the rotation speed to a first speed from the specific drive point determined under the preset restriction according to the driving force demand, and in response to a change of the gearshift position by the second gearshift position change mechanism, may set the effective drive point to an updated drive point with at least a change of the rotation speed to a second speed, which is different from the first speed, from the specific drive point determined under the preset restriction according to the driving force demand. The driver is accordingly given the adequate gear change feeling corresponding to the cause of the change of the gearshift position, that is, either the change of the gearshift position by the driver's gearshift position change operation or the change of the gearshift position according to the driver's depression amount of the accelerator pedal and the vehicle speed. In this case, the second speed may be lower than the first speed. This arrangement enables the driver to have adequate gear change feeling when the change of the gearshift position is triggered by the driver's gearshift position change operation. When the change of the gearshift position is triggered by the changes of the accelerator opening and the vehicle speed, on the other hand, this arrangement prevents the driver from feeling odd by an unexpected speed change.

In one preferable application of the motor vehicle of the invention, in response to a change of the gearshift position, the effective drive point setting module may set the effective drive point to an updated drive point with at least a change of the rotation speed corresponding to the changed gearshift position from the specific drive point determined under the preset restriction according to the driving force demand. This arrangement enables the driver to have adequate gear change feeling according to the changed gearshift position.

In another preferable application of the motor vehicle of the invention, in response to an upshift of the gearshift position, the effective drive point setting module may set the effective drive point to an updated drive point with a decrease of the rotation speed from the specific drive point determined under the preset restriction according to the driving force demand. This arrangement enables the driver to have adequate gear change feeling in response to an upshift of the gearshift position. In this application, in response to the upshift of the gearshift position, the effective drive point setting module may limit a maximum rotation speed of the internal combustion engine and set the effective drive point to an updated drive point with a decrease of the rotation speed within the restricted maximum rotation speed of the internal combustion engine from the specific drive point determined under the preset restriction according to the driving force demand.

In still another preferable application of the motor vehicle of the invention, in response to a downshift of the gearshift position, the effective drive point setting module may set the effective drive point to an updated drive point with an increase of the rotation speed from the specific drive point determined under the preset restriction according to the driving force demand. This arrangement enables the driver to have adequate gear change feeling in response to a downshift of the gearshift position.

In another preferable application of the motor vehicle of the invention, the effective drive point setting module may set the effective drive point to gradually approach to the specific drive point determined under the preset restriction according to the driving force demand, with elapse of time since the change of the gearshift position. This arrangement enables the drive point of the internal combustion engine to gradually approach to the specific drive point determined under the preset restriction with elapse of time since the change of the gearshift position.

In another preferable embodiment of the invention, the motor vehicle further includes an accumulator unit that is capable of inputting and outputting electric power from and to the power transmission assembly and the motor. The power transmission assembly may be an electric power-mechanical power input output mechanism that is connected to the internal combustion engine and to the axle and outputs at least part of the output power of the internal combustion engine to the axle through input and output of electric power and mechanical power. In this embodiment, in response to an upshift of the gearshift position, the effective drive point setting module may set the effective drive point to an updated drive point with a decrease of the rotation speed, which is lowered by a preset value corresponding to a first variation level within an input limit of the accumulator unit, from the specific drive point determined under the preset restriction according to the driving force demand. This arrangement effectively prevents the accumulator unit from being excessively charged in the process of changing the drive point in response to an upshift of the gearshift position. In this embodiment, in response to a downshift of the gearshift position, the effective drive point setting module may set the effective drive point to an updated drive point with an increase of the rotation speed, which is raised by a preset value corresponding to a second variation level within an output limit of the accumulator unit, from the specific drive point determined under the preset restriction according to the driving force demand. This arrangement effectively prevents the accumulator unit from being excessively discharged in the process of changing the drive point in response to a downshift of the gearshift position.

In the motor vehicle of the invention, one preferable example of the power transmission assembly may be a continuously variable transmission.

The present invention is also directed to a control method of a motor vehicle equipped with an internal combustion engine, a power transmission assembly, and a motor, where the power transmission assembly transmits at least part of output power of the internal combustion engine, which is driven at an arbitrary drive point regardless of a gearshift position, to an axle and the motor is capable of outputting power to the axle. The motor vehicle control method including the steps of: (a) in the case of no change of the gearshift position, setting an effective drive point to a specific drive point determined under a preset restriction according to a driving force demand specified as a requirement to be output to the axle and controlling the internal combustion engine, the power transmission assembly, and the motor to drive the internal combustion engine at the set effective drive point and to ensure output of a driving force equivalent to the driving force demand to the axle; and (b) in the case of a change of the gearshift position, setting the effective drive point to an updated drive point with at least a change of a rotation speed from the specific drive point determined under the preset restriction according to the driving force demand and controlling the internal combustion engine, the power transmission assembly, and the motor to drive the internal combustion engine at the set effective drive point and to ensure output of a driving force equivalent to the driving force demand to the axle.

In the case of no change of the gearshift position, the control method of the motor vehicle of the invention sets the effective drive point to a specific drive point determined under a preset restriction according to a driving force demand specified as a requirement to be output to the axle and controls the internal combustion engine, the power transmission assembly, and the motor to drive the internal combustion engine at the set effective drive point and to ensure output of a driving force equivalent to the driving force demand to the axle. In the case of a change of the gearshift position, on the other hand, the control method of the motor vehicle of the invention sets the effective drive point to an updated drive point with at least a change of the rotation speed from the specific drive point determined under the preset restriction according to the driving force demand and controls the internal combustion engine, the power transmission assembly, and the motor to drive the internal combustion engine at the set effective drive point and to ensure output of the driving force equivalent to the driving force demand to the axle. In response to a change of the gearshift position, the rotation speed of the internal combustion engine is changed to give the driver adequate gear change feeling. The driver naturally feels odd when no gear change feeling is given by the driver's active change of the gearshift position. The change of the rotation speed desirably prevents the driver from feeling something is wrong.

In the control method of the motor vehicle of the invention, the step (b), in response to a change of the gearshift position by a driver's gearshift position change operation, may set the effective drive point to an updated drive point with at least a change of the rotation speed to a first speed from the specific drive point determined under the preset restriction according to the driving force demand, and in response to a change of the gearshift position according to the driver's depression amount of an accelerator pedal and a vehicle speed regardless of the driver's gearshift position change operation, may set the effective drive point to an updated drive point with at least a change of the rotation speed to a second speed, which is different from the first speed, from the specific drive point determined under the preset restriction according to the driving force demand. Also, the step (b), in response to an upshift of the gearshift position, may set the effective drive point to an updated drive point with a decrease of the rotation speed from the specific drive point determined under the preset restriction according to the driving force demand. Further, the step (b), in response to a downshift of the gearshift position, may set the effective drive point to an updated drive point with an increase of the rotation speed from the specific drive point determined under the preset restriction according to the driving force demand. Furthermore, the step (b) may set the effective drive point to gradually approach to the specific drive point determined under the preset restriction according to the driving force demand, with elapse of time since the change of the gearshift position.

BRIEF DESCRIPTION OF THE DRAWINGS

FIG. 6 is a flowchart showing the details of an upshift target rotation speed updating process executed by the hybrid electronic control unit at step S170 in the drive control routine of FIG. 2;

FIG. 7 is a flowchart showing the details of a downshift target rotation speed updating process executed by the hybrid electronic control unit at step S180 in the drive control routine of FIG. 2;

DESCRIPTION OF THE PREFERRED EMBODIMENTS

Figure 1:
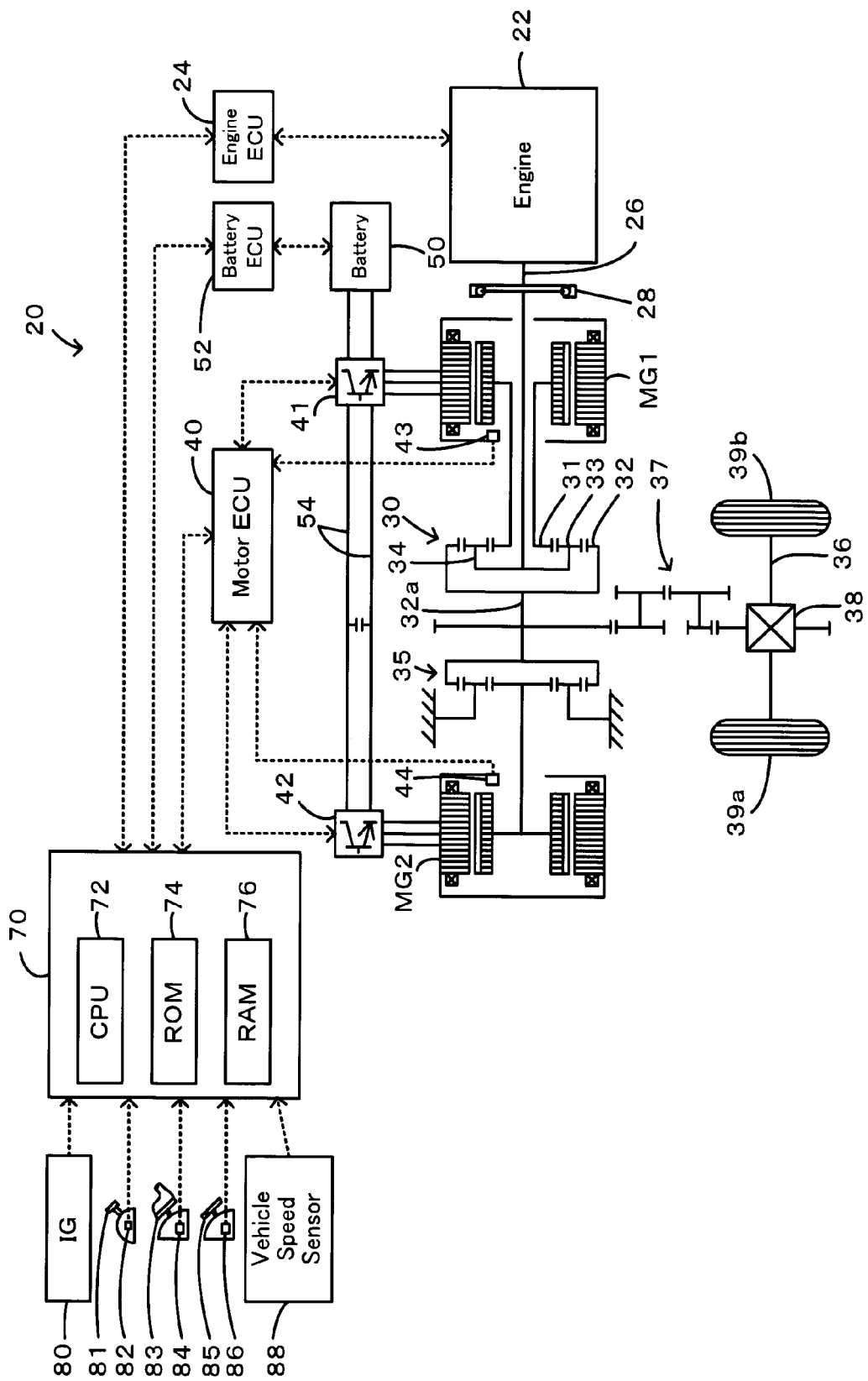
FIG. 1 schematically illustrates the configuration of a hybrid vehicle in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a motor MG2 that is connected to the power distribution integration mechanism 30 via a reduction gear 35, and a hybrid electronic control unit 70 that controls the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 37, the differential gear 38 and an axle 36 from ring gear shaft 32a.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged, when the input and output of electric powers are balanced between the motors MG1 and MG2. Both the motors MG1 and MG2 are driven and controlled by a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 executes a rotation speed computation routine (not shown) to calculate rotation speeds Nm1 and Nm2 of the rotors of the motors MG1 and MG2 from the input signals from the rotational position detection sensors 43 and 44. The motor ECU 40 establishes communication with the hybrid electronic control unit 70 to drive and control the motors MG1 and MG2 in response to control signals received from the hybrid electronic control unit 70, while outputting data regarding the driving conditions of the motors MG1 and MG2 to the hybrid electronic control unit 70 according to the requirements.

The battery 50 is under control of a battery electronic control unit 52 (hereafter referred to as battery ECU 52). The batter ECU 52 inputs signals required for management of the battery 50, for example, an inter-terminal voltage Vb from a voltage sensor (not shown) located between terminals of the battery 50, a charge-discharge current from a current sensor (not shown) located in the power line 54 connecting with an output terminal of the battery 50, and a battery temperature Tb from a temperature sensor (not shown) attached to the battery 50. The battery ECU 52 outputs data regarding the conditions of the battery 50 to the hybrid electronic control unit 70 by communication according to the requirements. For management of the battery 50, the battery ECU 52 computes a remaining charge level or current state of charge (SOC) of the battery 50 from an integration of the charge-discharge current measured by the current sensor (not shown).

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The gearshift position SP of the gearshift lever 81 is selectable among available gear positions, that is, a drive position for general forward drive, a reverse position for reverse drive, a braking position for applying a greater braking force in the accelerator-off state than the drive position, a parking position for parking lock, a neutral position for keeping the gear neutral, and a sequential gearshift range. The sequential gearshift range of this embodiment has five sequential gear positions 'S1' to 'S5'. In response to the driver's operation of the gearshift lever 81, the gear position is shifted up or down in the sequential gearshift range. Under the condition that the accelerator opening Acc reaches or exceeds a preset upper limit, for example, 90%, the gear position is shifted up in the sequential gearshift range with a variation in vehicle speed V, regardless of the driver's operation of the gearshift lever 81. Under the condition that the accelerator opening Acc is not greater than a preset lower limit, for example, 10%, the gear position is shifted down in the sequential gearshift range with a variation in vehicle speed V, regardless of the driver's operation of the gearshift lever 81. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment having the above construction sets a torque demand to be output to the ring gear shaft 32a or the drive shaft linked to the drive wheels 39a and 39b via the axle 36, based on the given vehicle speed V and the given accelerator opening Acc (equivalent to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops.

Figure 2:
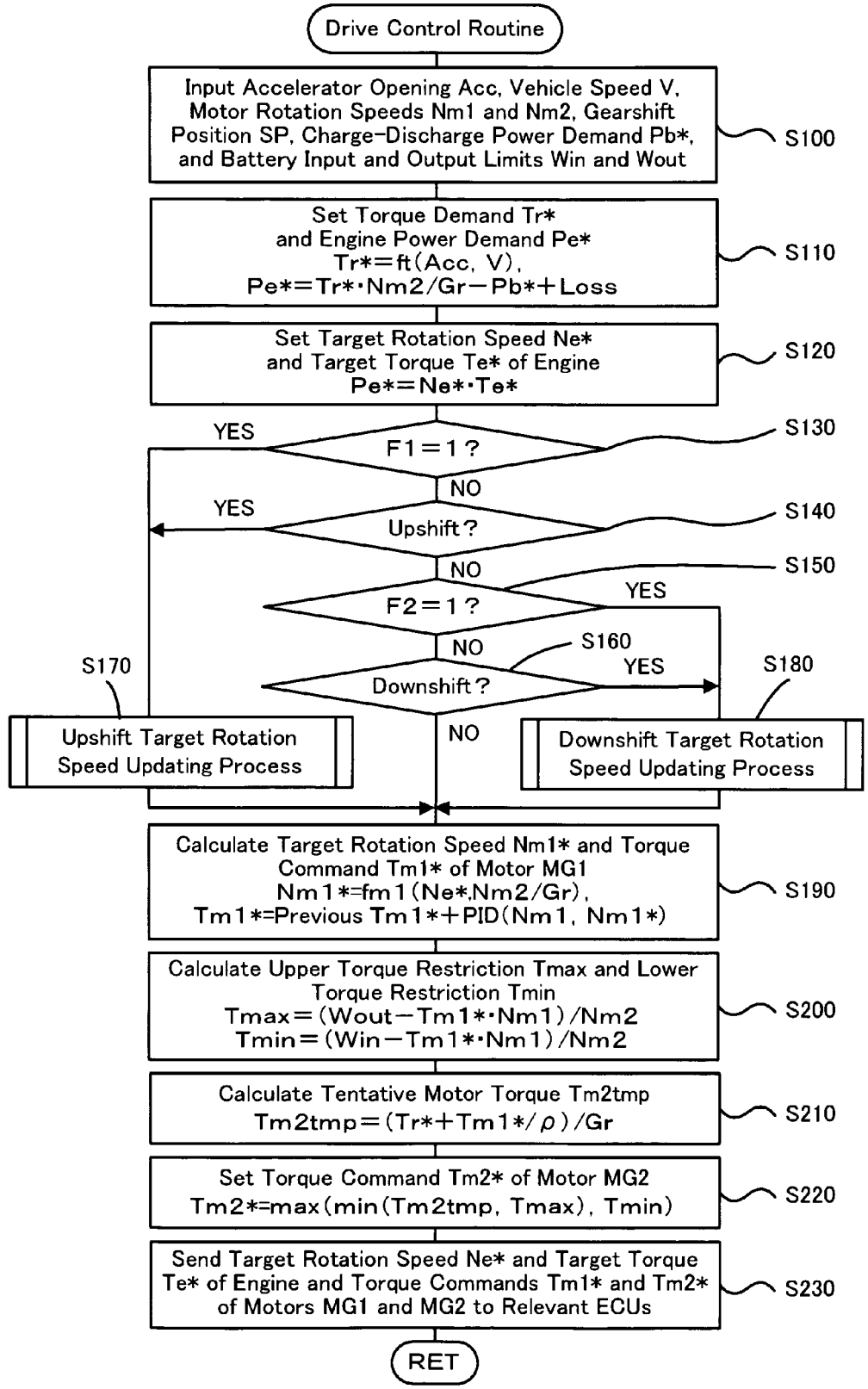
FIG. 2 is a flowchart showing a drive control routine executed by a hybrid electronic control unit included in the hybrid vehicle of the embodiment.

The description regards the operations of the hybrid vehicle 20 of the embodiment having the configuration discussed above, especially a series of control in response to an upshift or a downshift in the sequential gearshift range of the gearshift position SP. FIG. 2 is a flowchart showing a drive control routine executed by the hybrid electronic control unit 70. This drive control routine is carried out repeatedly at preset time intervals, for example, at every several msec, in the sequential gearshift range of the gearshift position SP.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, the gearshift position SP from the gearshift position sensor 82, rotation speeds Nm1 and Nm2 of the motors MG1 and MG2, a charge-discharge power demand Pb* to be charged into the battery 50 or to be discharged from the battery 50, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* of the battery 50 is set based on the state of charge SOC of the battery 50 and is received from the battery ECU 52 by communication. The input limit Win and the output limit Wout of the battery 50 are set based on the battery temperature Tb and the state of charge SOC and are received from the battery ECU 52 by communication.

Figure 3:
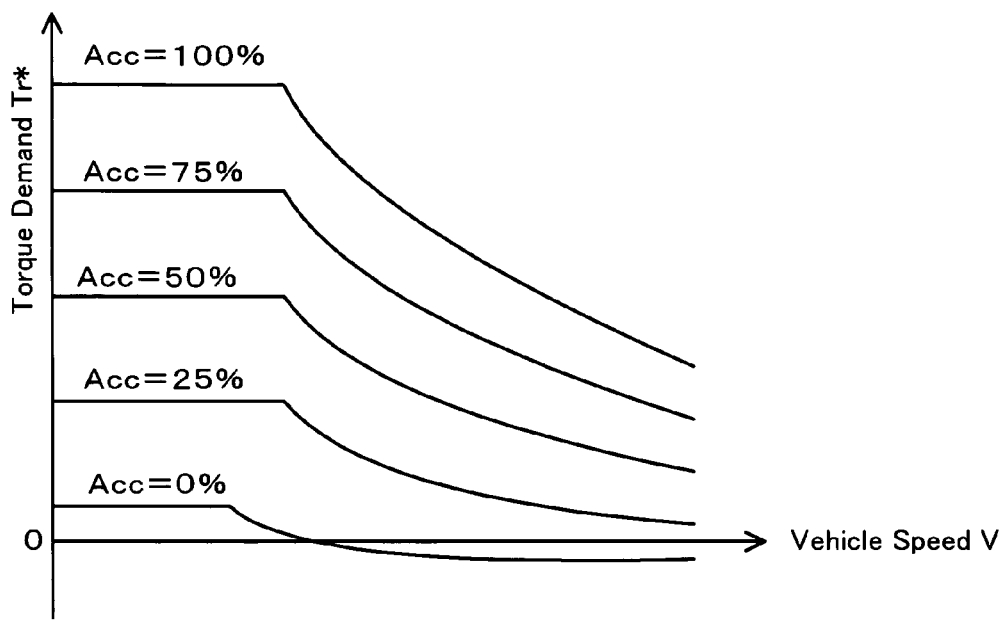
FIG. 3 shows one example of a torque demand setting map.
Figure 4:
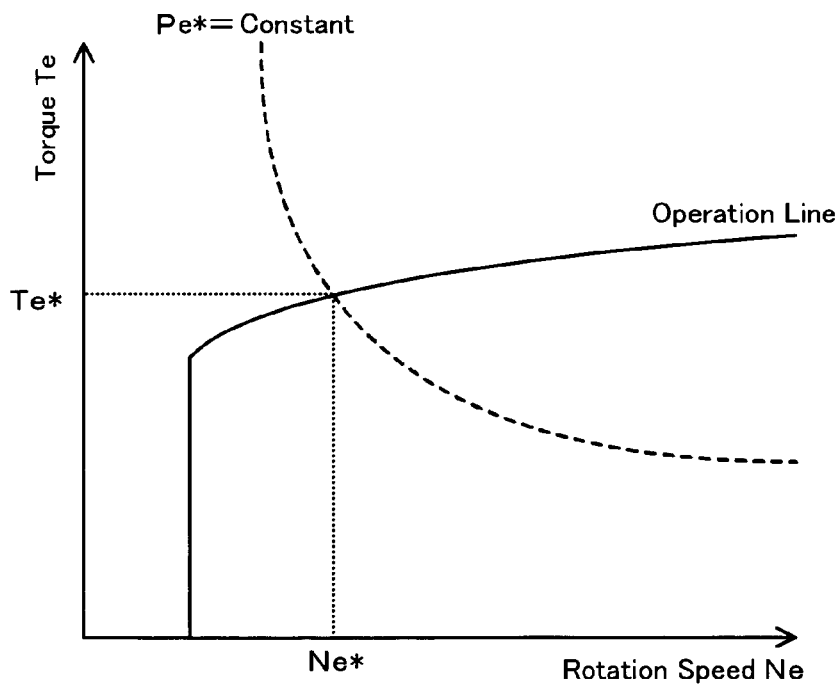
FIG. 4 shows an efficient operation line of an engine to set a target rotation speed Ne* and a target torque Te*.

After the data input, the CPU 72 sets a torque demand Tr* to be output to the ring gear shaft 32a or the drive shaft linked to the drive wheels 39a and 39b via the axle 36 and an engine power demand Pe* to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the map. One example of the torque demand setting map is shown in FIG. 3. The engine power demand Pe* is calculated as the sum of the product of the torque demand Tr* and a rotation speed Nr of the ring gear shaft 32a, the charge-discharge power demand Pb* of the battery 50, and a potential loss. The rotation speed Nr of the ring gear shaft 32a is obtained by dividing the rotation speed Nm2 of the motor MG2 by a gear ratio Gr of the reduction gear 35 or by multiplying the vehicle speed V by a conversion factor k The CPU 72 subsequently sets a target rotation speed Ne* and a target torque Te* of the engine 22 corresponding to the engine power demand Pe* (step S120). The target rotation speed Ne* and the target torque Te* of the engine 22 are determined according to an efficient operation line of ensuring efficient operations of the engine 22 and a curve of the engine power demand Pe*. FIG. 4 shows an efficient operation line of the engine 22 to set the target rotation speed Ne* and the target torque Te*. As clearly shown in FIG. 4, the target rotation speed Ne* and the target torque Te* are given as an intersection of the efficient operation line and a curve of constant engine power demand Pe* (=Ne*×Te*).

The CPU 72 then identifies the requirement for an upshift target rotation speed updating process and the requirement for a downshift target rotation speed updating process (steps S130 to S160). In order to identify the requirement for the upshift target rotation speed updating process, the procedure of this embodiment successively determines whether a flag F1 is equal to '1' (step S130) and whether the gear position has just been shifted up in the sequential gearshift range (step S140). In order to identify the requirement for the downshift target rotation speed updating process, the procedure of this embodiment successively determines whether a flag F2 is equal to '1' (step S150) and whether the gear position has just been shifted down in the sequential gearshift range (step S160). The flag F1 has an initial value of '0' and is set equal to '1' during execution of the upshift target rotation speed updating process. Similarly the flag F2 has an initial value of '0' and is set equal to '1' during execution of the downshift target rotation speed updating process. The upshift, for example, from the gear position 'S3' to the gear position 'S4' or the downshift, for example, from the gear position 'S4' to the gear position 'S3' is identified by comparison between a previous setting and a current setting of the input gearshift position SP. When both the flags F1 and F2 are equal to '0' and neither an upshift nor a downshift is identified (steps S130 to S160), there are no requirements for the upshift target rotation speed updating process and for the downshift target rotation speed updating process. In this case, the CPU 72 calculates a target rotation speed Nm1* of the motor MG1 from the target rotation speed Ne* of the engine 22 set at step S120, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S190):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2\int (Nm1^* - Nm1)dt \quad (2)$$

Figure 5:
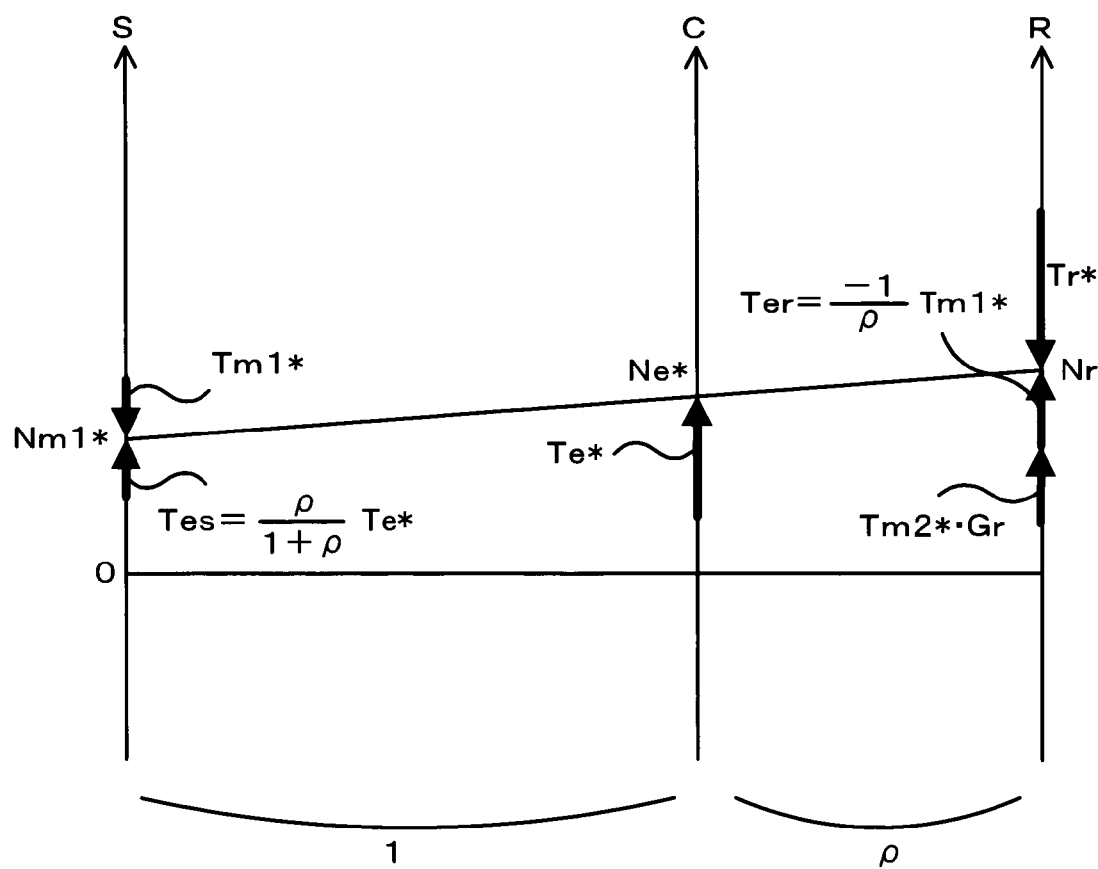
FIG. 5 is an alignment chart showing torque-rotation speed dynamics of respective rotation elements included in a power distribution integration mechanism in the hybrid vehicle of the embodiment.

Equation (1) is a dynamic relational expression of the rotation elements included in the power distribution integration mechanism 30. FIG. 5 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a). The target rotation speed Nm1* of the motor MG1 is thus readily obtained according to the torque-rotation speed dynamics of this alignment chart. Drive control of the motor MG1 with the settings of the torque command Tm1* and the target rotation speed Nm1* enables rotation of the engine 22 at the target rotation speed Ne*. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term. Two upward thick arrows on the axis 'R' in FIG. 5 respectively show a torque that is directly transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2.

After calculation of the target rotation speed Nm1* and the torque command Tm1* of the motor MG1, the CPU 72 calculates an upper torque restriction Tmax and a lower torque restriction Tmin as maximum and minimum torques output from the motor MG2 according to Equations (3) and (4) given below (step S200):

$$Tmax=(Wout-Tm1^* \cdot Nm1)/Nm2 \qquad (3)$$

$$Tmin=(Win-Tm1^* \cdot Nm1)/Nm2 \qquad (4)$$

The upper torque restriction Tmax and the lower torque restriction Tmin are respectively given by dividing a difference between the input limit Win of the battery 50 and power consumption (power generation) of the motor MG1, which is the product of the torque command Tm1* and the input current rotation speed Nm1 of the motor MG1, and a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S210):

$$Tm2tmp=(Tr^*+Tm1^*/\rho)/Gr \qquad (5)$$

The CPU 72 limits the tentative motor torque Tm2*tmp* to the range between the calculated lower torque restriction Tmin and upper torque restriction Tmax to set a torque command Tm2* of the motor MG2 (step S220). Setting the torque command Tm2* of the motor MG2 in this manner restricts the torque demand Tr* to be output to the ring gear shaft 32*a* within the range between the input limit Win and the output limit Wout of the battery 50. Equation (5) is readily introduced from the alignment chart of FIG. 5.

The CPU 72 sends the target rotation speed Ne* and the target torque Te* of the engine 22 to the engine ECU 24 and the torque commands Tm1* and Tm2* of the motors MG1 and MG2 to the motor ECU 40 (step S230), and then exits from this drive control routine. The engine ECU 24 receives the target rotation speed Ne* and the target torque Te* and performs fuel injection control and ignition control to drive the engine 22 at the specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

In response to identification of an upshift at step S140, the CPU 72 executes the upshift target rotation speed updating process (step S170) and then goes to the processing of and after step S190 described above. The details of the upshift target rotation speed updating process of step S170 are described with reference to the flowchart of FIG. 6. In the upshift target rotation speed updating process, the CPU 72 first identifies a flag G representing a change of the target rotation speed Ne* of the engine 22 (step S300). When the flag G is equal to '0' at step S300, the CPU 72 sets a predetermined reference value α1 to a correction value α (step S310) and subtracts the correction value α from the target rotation speed Ne* of the engine 22 set at step S120 in the drive control routine of FIG. 2 to update the target rotation speed Ne* of the engine 22 (step S320). The CPU 72 then sets both the flag G and the flag F1 equal to '1' (steps S330 and S370) and terminates the upshift target rotation speed updating process. The reference value α1 represents a degree of decreasing the target rotation speed Ne* of the engine 22 and depends upon the characteristics of the engine 22. When the gear position is shifted up in the sequential gearshift range, the target rotation speed Ne* of the engine 22 is lowered than the engine rotation speed at the drive point without a change of the gearshift position SP, that is, the engine rotation speed at the efficient drive point of ensuring the efficient operation of the engine 22. Such a decrease of the target rotation speed Ne* of the engine 22 in response to an upshift enables the driver to have adequate gear change feeling and thus prevents the driver from feeling something is wrong. Setting the value '1' to the flag F1 gives an affirmative answer, that is, execution of the upshift target rotation speed updating process, at step S130 in a next cycle of the drive control routine of FIG. 2.

When the flag G is equal to '1' at step S300, on the other hand, the CPU 72 subtracts a preset value Δα from a previous setting of the correction value α (previous α), which has been set in the previous cycle of the upshift target rotation speed updating process, to update the correction value α (step S340) and checks the correction value α (step S350). When the correction value α is positive, the CPU 72 updates the target rotation speed Ne* of the engine 22 (step S360) by the subtraction in the same manner as step S320, sets the flag F1 equal to '1' (step S370), and terminates the upshift target rotation speed updating process. The preset value Δα represents a degree of making the target rotation speed Ne* of the engine 22 approach to the engine rotation speed at the efficient drive point in every cycle of the upshift target rotation speed updating process. The preset value Δα is smaller than the reference value α1 and depends upon the characteristics of the engine 22. The repeated execution of the upshift target rotation speed updating process gradually decreases the correction value α and makes the target rotation speed Ne* of the engine 22 with the upshift gradually approach to the engine rotation speed at the efficient drive point. When the correction value α becomes equal to or less than '0' (step S350), the CPU 72 sets the flag F1 equal to '0' (step S380) and terminates the upshift target rotation speed updating process without updating the target rotation speed Ne* of the engine 22. Setting the value '0' to the flag F1 gives a negative answer, that is, no execution of the upshift target rotation speed updating process, at step S130 in the next cycle of the drive control routine of FIG. 2.

Referring back to the drive control routine of FIG. 2, in response to identification of a downshift at step S160, the CPU 72 executes the downshift target rotation speed updating process (step S180) and then goes to the processing of and after step S190 described above. The details of the downshift target rotation speed updating process of step S180 are described with reference to the flowchart of FIG. 7. In the downshift target rotation speed updating process, when the flag G is equal to '0' (step S400), the CPU 72 sets a predetermined reference value β1 to a correction value β (step S410) and adds the correction value β to the target rotation speed Ne* of the engine 22 set at step S120 in the drive control routine of FIG. 2 to update the target rotation speed Ne* of the engine 22 (step S420). The CPU 72 then sets both the flag G and the flag F2 equal to '1' (steps S430 and S470) and terminates the downshift target rotation speed updating process. The reference value β1 represents a degree of increasing the target rotation speed Ne* of the engine 22 and depends upon the characteristics of the engine 22. When the gear position is shifted down in the sequential gearshift range, the target rotation speed Ne* of the engine 22 is raised to be higher than the engine rotation speed at the efficient drive point of ensuring the efficient operation of the engine 22. Such an increase of the target rotation speed Ne* of the engine 22 in response to a downshift enables the driver to have adequate gear change feeling and thus prevents the driver from feeling something is wrong. Setting the value '1' to the flag F2 gives an affirmative answer, that is, execution of the downshift target rotation speed updating process, at step S150 in a next cycle of the drive control routine of FIG. 2.

When the flag G is equal to '1' at step S400, on the other hand, the CPU 72 subtracts a preset value Δβ from a previous setting of the correction value β (previous β), which has been set in the previous cycle of the downshift target rotation speed updating process, to update the correction value β (step S440). When the updated correction value β is positive (step S450), the CPU 72 updates the target rotation speed Ne* of the engine 22 (step S460) by the addition in the same manner as step S420, sets the flag F2 equal to '1' (step S470), and terminates the downshift target rotation speed updating process. The preset value Δβ represents a degree of making the target rotation speed Ne* of the engine 22 approach to the engine rotation speed at the efficient drive point in every cycle of the downshift target rotation speed updating process. The preset value Δβ is smaller than the reference value β1 and depends upon the characteristics of the engine 22. The repeated execution of the downshift target rotation speed updating process makes the target rotation speed Ne* of the engine 22 with the downshift gradually approach to the engine rotation speed at the efficient drive point. When the correction value β becomes equal to or less than '0' (step S450), the CPU 72 sets the flag F2 equal to '0' (step S480) and terminates the downshift target rotation speed updating process without updating the target rotation speed Ne* of the engine 22. Setting the value '0' to the flag F2 gives a negative answer, that is, no execution of the downshift target rotation speed updating process, at step S150 in the next cycle of the drive control routine of FIG. 2.

Figure 8:
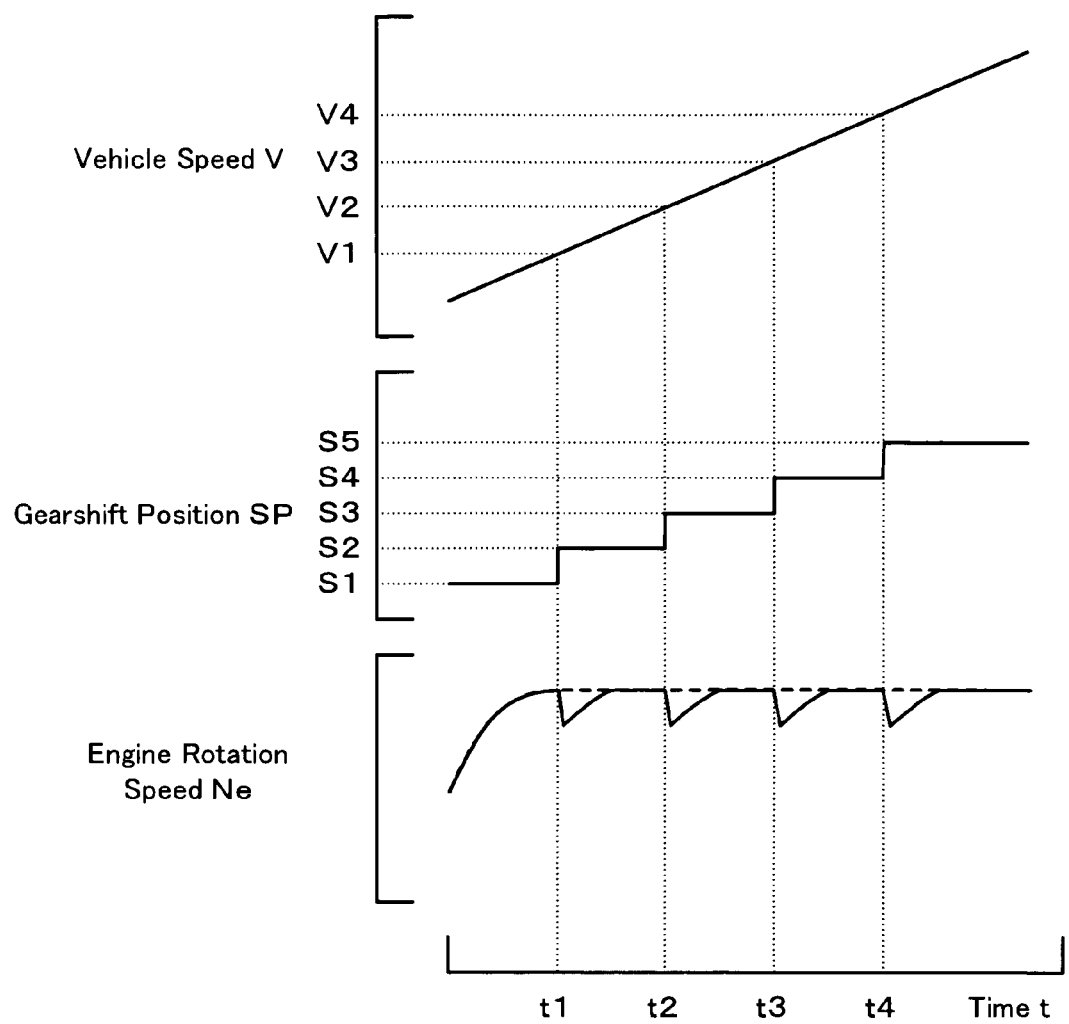
FIG. 8 shows time variations in vehicle speed V, gearshift position SP, and rotation speed Ne of an engine in response to an upshift.

FIG. 8 shows time variations of the vehicle speed V, the gearshift position SP, and the rotation speed Ne of the engine 22 in response to an upshift. The curve of solid line shows the drive control of this embodiment that makes a variation in rotation speed Ne of the engine 22 in response to each change of the gearshift position SP. The curve of broken line shows the prior art drive control that makes no variation in rotation speed Ne of the engine 22 in response to any change of the gearshift position SP. It is assumed that the driver depresses the accelerator pedal 83 to a relatively great depth to accelerate the hybrid vehicle 20. The prior art drive control does not vary the rotation speed Ne of the engine 22 in response to an upshift of the gearshift position SP from 'S1' to S2' with an increase in vehicle speed V to a preset level V1 at a time t1. No variation in engine rotation speed makes the driver feel something is wrong, since the driver is generally familiar with gear change feeling in a conventional motor vehicle equipped with a stepped automatic transmission that changes the gear to convert the output power of an engine and transmits the converted power to an axle. The drive control of this embodiment, on the other hand, once lowers the rotation speed Ne of the engine 22 in response to the upshift of the gearshift position SP from 'S1' to 'S2' with the increase in vehicle speed V to the preset level V1 at the time t1 and then gradually raises the rotation speed Ne of the engine 22 to approach to an expected level of the engine rotation speed without a change of the gearshift position SP. Such a variation in engine rotation speed enables the driver to have adequate gear change feeling, which is similar to the familiar gear change feeling in the conventional motor vehicle equipped with the stepped automatic transmission. Namely the drive control of the embodiment effectively prevents the driver from feeling something is wrong. In any upshift in the sequential gearshift range, for example, from 'S2' to 'S3', the drive control of this embodiment once lowers the rotation speed Ne of the engine 22 and then gradually raises the rotation speed Ne to approach to the expected level of engine rotation speed without a change of the gearshift position SP. This enables the driver to have adequate gear change feeling.

In the hybrid vehicle 20 of the embodiment described above, in response to an upshift in the sequential gearshift range of the gearshift position SP, the drive control decreases the target rotation speed Ne* of the engine 22 to be lower than the engine rotation speed at the efficient drive point. In response to a downshift in the sequential gearshift range, the drive control increases the target rotation speed Ne* of the engine 22 to be higher than the engine rotation speed at the efficient drive point. Such drive control enables the driver to have adequate gear change feeling in response to an upshift or a downshift. The driver is generally familiar with gear change feeling in the conventional motor vehicle equipped with the stepped automatic transmission that changes the gear to convert the output power of the engine and transmits the converted power to the axle. This arrangement desirably prevents the driver from feeling something is wrong.

The hybrid vehicle 20 of the embodiment has the sequential gearshift range, where the gear position is shifted up according to the vehicle speed V even without the driver's upshift operation under the condition that the accelerator opening Acc reaches or exceeds the preset upper limit. Such drive control enables the driver to have adequate gear change feeling, which is similar to the familiar gear change feeling in the conventional motor vehicle equipped with the stepped automatic transmission.

In the hybrid vehicle 20 of the embodiment, the reference values α1 and β1 are set to the fixed values regardless of the new gear position, for example, 'S3' or 'S4', after the gear change in the upshift target rotation speed updating process of FIG. 6 and the downshift target rotation speed updating process of FIG. 7. The reference values α1 and β1 may, however, be varied according to the new gear position after the gear change. For example, the reference values α1 and β1 may have smaller values corresponding to the lower gear positions after the gear change.

In the hybrid vehicle 20 of the embodiment, the drive control decreases the target rotation speed Ne* of the engine 22 in response to an upshift and increases the target rotation speed Ne* of the engine 22 in response to a downshift. One possible modification of the drive control decreases the target rotation speed Ne* in response to an upshift while keeping the target rotation speed Ne* unchanged in response to a downshift. Another possible modification of the drive control increases the target rotation speed Ne* in response to a downshift while keeping the target rotation speed Ne* unchanged in response to an upshift.

In the hybrid vehicle 20 of the embodiment, the upshift target rotation speed updating process of FIG. 6 subtracts the correction value α from the target rotation speed Ne* of the engine 22, which has been set at step S120 in the drive control routine of FIG. 2, to update the target rotation speed Ne* of the engine 22. The target rotation speed Ne* of the engine 22 may be updated by another technique. For example, one modified procedure may multiply the target rotation speed Ne* of the engine 22, which has been set at step S120 in the drive control routine of FIG. 2, by a preset correction coefficient κ1 that is smaller than 1, to update the target rotation speed Ne* of the engine 22. Similarly one modified procedure of the downshift target rotation speed updating process of FIG. 7 may multiply the target rotation speed Ne* of the engine 22, which has been set at step S120 in the drive control routine of FIG. 2, by a preset correction coefficient κ2 that is greater than 1, to update the target rotation speed Ne* of the engine 22.

Figure 9:
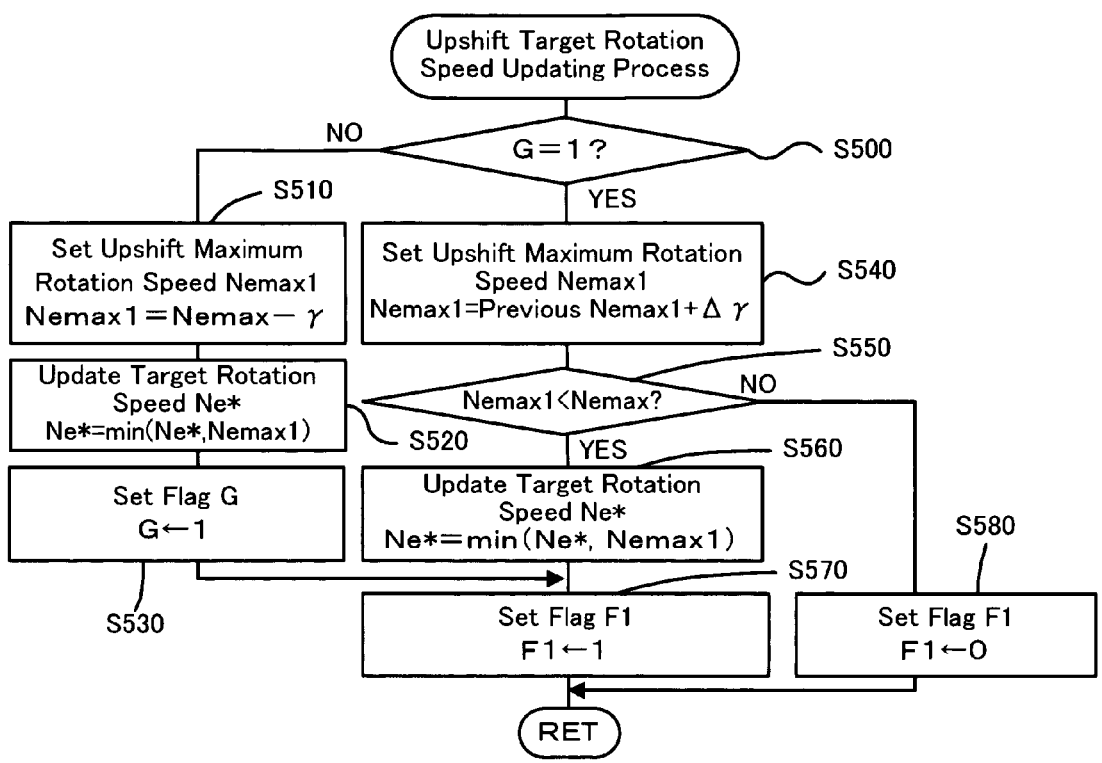
FIG. 9 is a flowchart showing a modified flow of the upshift target rotation speed updating process executed by the hybrid electronic control unit.

In the hybrid vehicle 20 of the embodiment, the upshift target rotation speed updating process of FIG. 6 directly corrects the target rotation speed Ne* of the engine 22. The target rotation speed Ne* of the engine 22 may be restricted to a maximum rotation speed Nemax as an upper limit of the available rotation speed for driving the engine 22. One modified flow of the upshift target rotation speed updating process is shown in the flowchart of FIG. 9. In the modified flow of the upshift target rotation speed updating process of FIG. 9, when the flag G is equal to '0' at step S500, the CPU 72 subtracts a specific value γ from the preset maximum rotation speed Nemax to set an upshift maximum rotation speed Nemax1 (step S510). The target rotation speed Ne* of the engine 22, which has been set at step S120 in the drive control routine of FIG. 2, is restricted to the upshift maximum rotation speed Nemax1 (step S520). The modified flow successively sets the flags G and F1 to '1' (steps S530 and S570) and terminates the upshift target rotation speed updating process of FIG. 9. The specific value γ is set to make the target rotation speed Ne* of the engine 22 under an upshift lower than the target rotation speed Ne* of the engine 22 without any gear change of the gearshift position SP and depends upon the characteristics of the engine 22. When the flag G is equal to '1' at step S500, on the other hand, the CPU 72 adds a preset value Δγ, which is smaller than the specific value γ, to a previous setting of the upshift maximum rotation speed Nemax1 (previous Nemax1) set in the previous cycle of the modified upshift target rotation speed updating process of FIG. 9 to update the upshift maximum rotation speed Nemax1 (step S540). When the updated upshift maximum rotation speed Nemax1 is lower than the preset maximum rotation speed Nemax (step S550), the CPU 72 restricts the target rotation speed Ne* of the engine 22 to the upshift maximum rotation speed Nemax1 (step S560) like step S520 and sets the flag F1 to '1' (step S570). When the updated upshift maximum rotation speed Nemax is not lower than the preset maximum rotation speed Nemax (step S550), on the other hand, the CPU 72 sets the flag F1 to '0' and exits from the modified upshift target rotation speed updating process of FIG. 9. This modified drive control restricts the target rotation speed Ne* of the engine 22 to the upshift maximum rotation speed Nemax1 and thereby enables the driver to have adequate gear change feeling.

Figure 10:
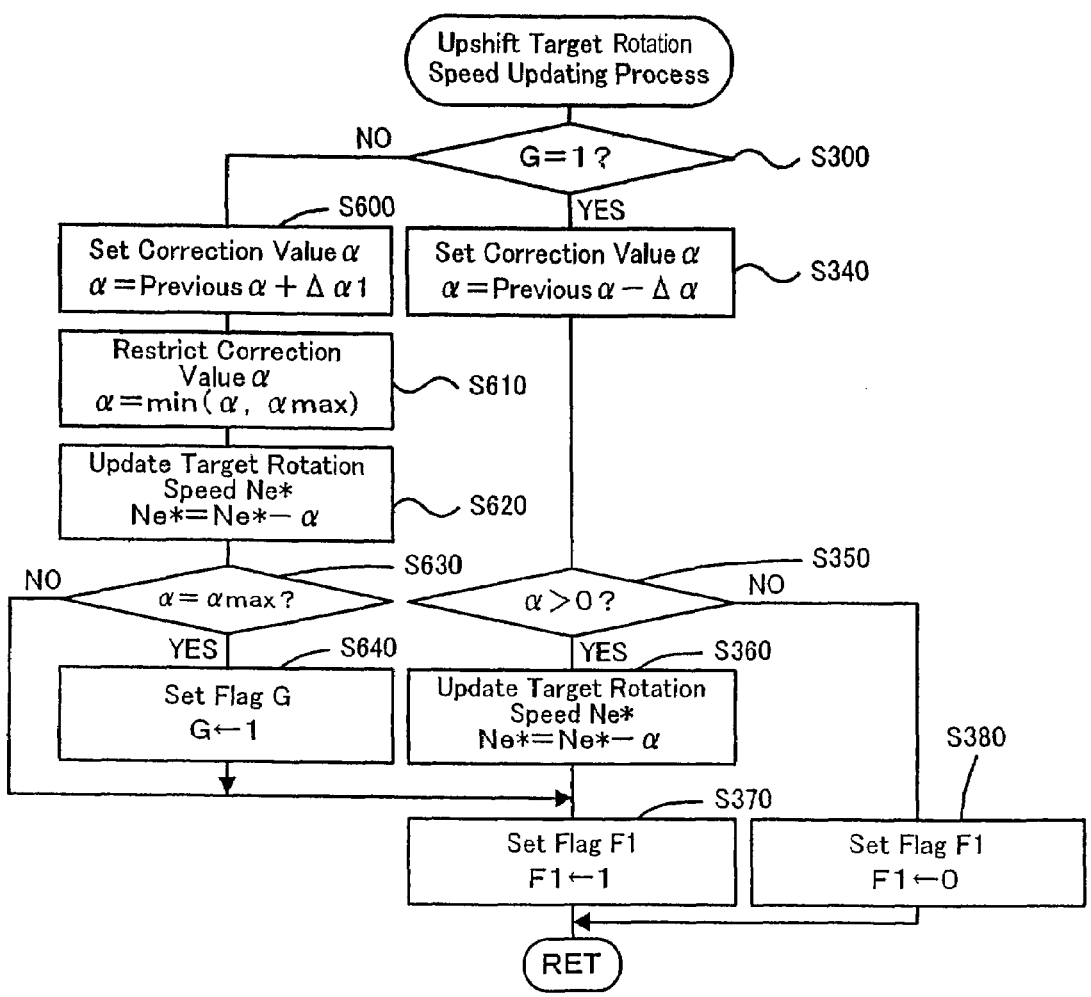
FIG. 10 is a flowchart showing another modified flow of the upshift target rotation speed updating process executed by the hybrid electronic control unit.

In the hybrid vehicle 20 of the embodiment, the upshift target rotation speed updating process of FIG. 6 and the downshift target rotation speed updating process of FIG. 7 changes the target rotation speed Ne* of the engine 22 regardless of the input and output limits Win and Wout of the battery 50. One possible modification may change the target rotation speed Ne* of the engine 22 in relation to the input and output limits Win and Wout of the battery 50. The flowcharts of FIG. 10 and FIG. 11 respectively show modified flows of the upshift target rotation speed updating process and the downshift target rotation speed updating process with consideration of the input and output limits Win and Wout of the battery 50. The modified upshift target rotation speed updating process of FIG. 10 is identical with the upshift target rotation speed updating process of FIG. 6, except replacement of steps S310 to S330 by steps S600 to S640. In the modified upshift target rotation speed updating process of FIG. 10, when the flag G is equal to '0' (step S300), the CPU 72 adds a specific value Δα1 to a previous setting of a correction value α (previous a) set in the previous cycle of the upshift target rotation speed updating process to update the correction value α (step S600). The CPU 72 then restricts the updated correction value α to a maximum correction value αmax as an upper limit (step S610) and subtracts the restricted correction value α from the target rotation speed Ne* of the engine 22, which has been set at step S120 in the drive control routine of FIG. 2, to update the target rotation speed Ne* of the engine 22 (step S620). When the correction value α is not equal to the maximum correction value αmax (step S630), the CPU 72 sets the flag F1 to '1' (step S370) and exits from the modified upshift target rotation speed updating process of FIG. 10. The correction value α is set equal to '0' as an initial value. The maximum correction value αmax is equivalent to the reference value α1 in the upshift target rotation speed updating process of FIG. 6. The specific value Δα1 represents a degree of decreasing the target rotation speed Ne* of the engine 22 in every cycle of the upshift target rotation speed updating process and depends upon the input limit Win of the battery 50. The specific value Δα1 is set by taking into account the input limit Win of the battery 50, because of the following reason. It is assumed that the rotation speed Ne of the engine 22 is lowered in the ordinary drive state of the hybrid vehicle 20. The rotation speed Ne of the engine 22 decreases with an increase in torque Tm1 output from the motor MG1. The increase in output torque Tm1 of the motor MG1 increases the electric power (Tm1·Nm1) generated by the motor MG1. The surplus electric power unconsumed by the motor MG2 is charged into the battery 50. In order to prevent input of excess electric power into the battery 50, the specific value Δα1 is set by taking into account the input limit Win of the battery 50. Setting a maximum possible value to the specific value Δα1 with consideration of the input limit Win of the battery 50 enables the driver to promptly have gear change feeling. Each cycle of the upshift target rotation speed updating process gradually increases the correction value α and decreases the target rotation speed Ne* of the engine 22. The flag G is set equal to '1' (step S640) when the correction value α reaches the maximum correction value αmax at step S630. The processing flow in the upshift target rotation speed updating process of FIG. 10 under the condition that the flag G is equal to '1' at step S300 is identical with the processing flow in the upshift target rotation speed updating process of FIG. 6 and is not specifically described here.

Figure 11:
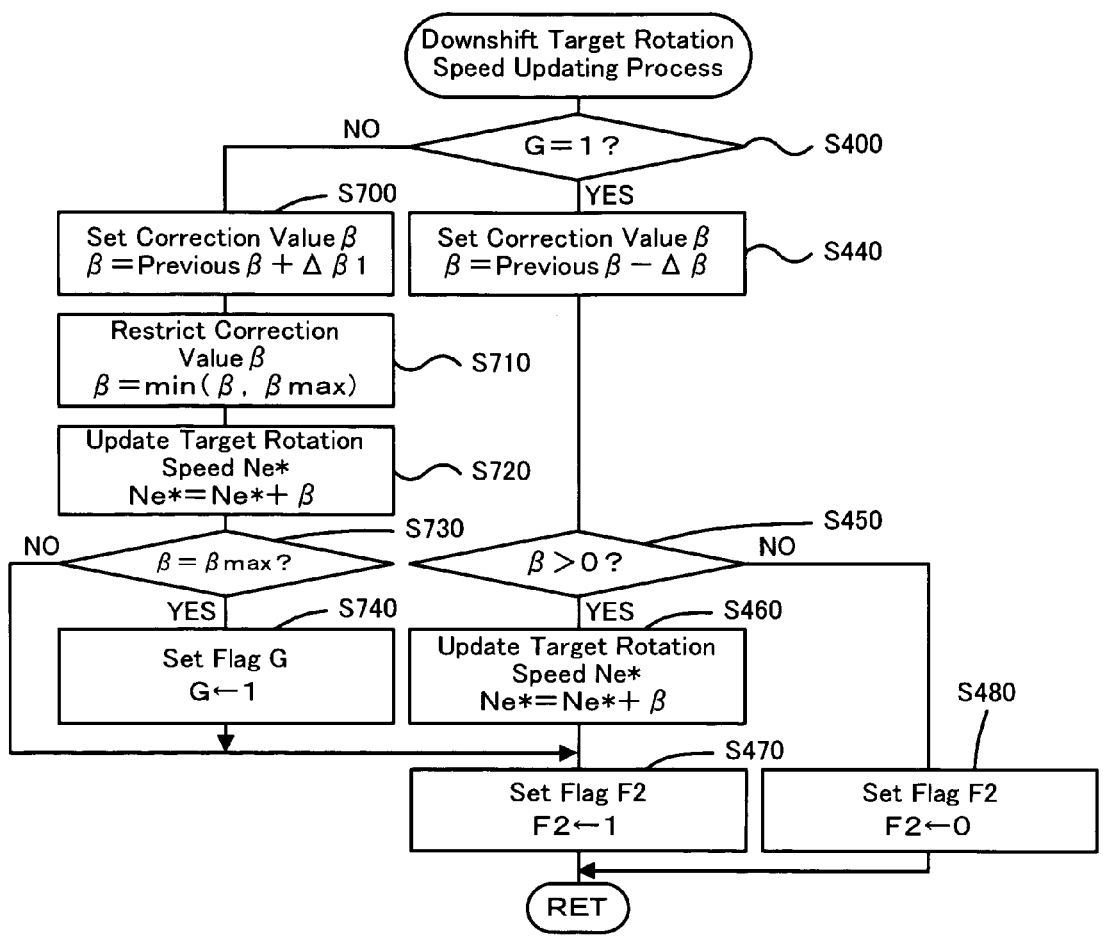
FIG. 11 is a flowchart showing a modified flow of the downshift target rotation speed updating process executed by the hybrid electronic control unit.
Figure 12:
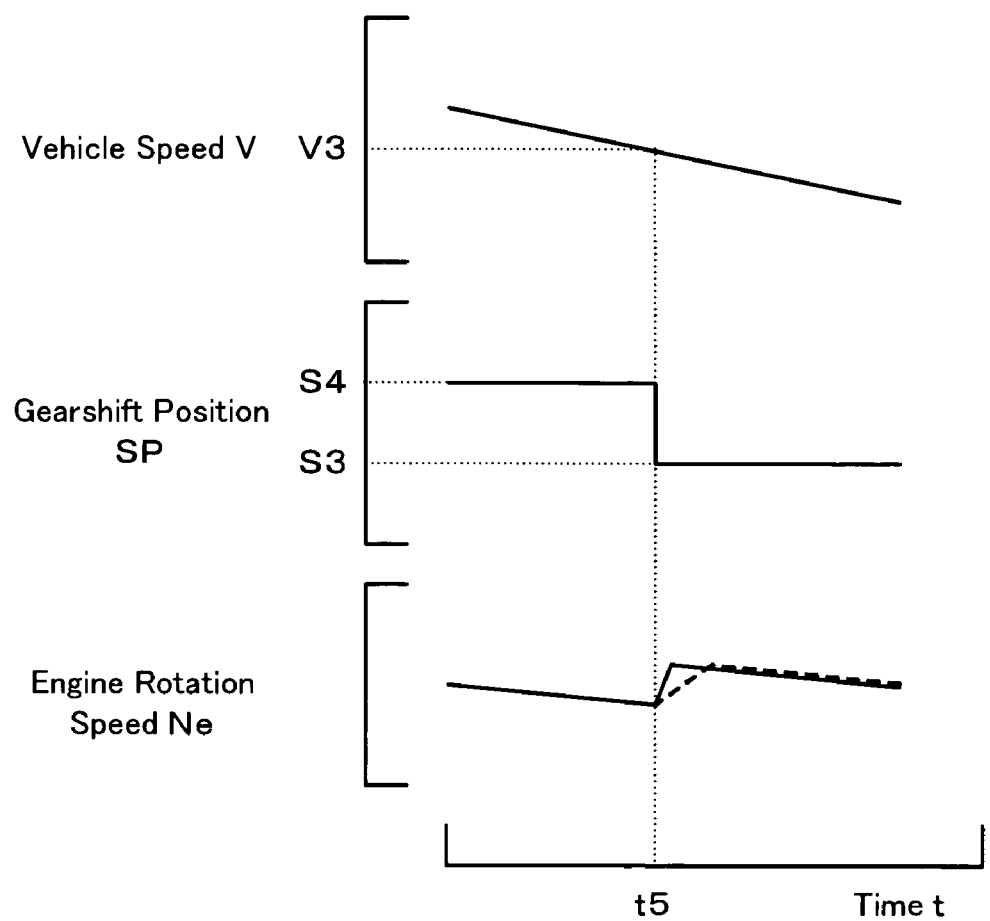
FIG. 12 shows time variations in vehicle speed V, gearshift position SP, and rotation speed Ne of the engine in response to a downshift.

The modified downshift target rotation speed updating process of FIG. 11 is identical with the downshift target rotation speed updating process of FIG. 7, except replacement of steps S410 to S430 by steps S700 to S740. In the modified downshift target rotation speed updating process of FIG. 11, when the flag G is equal to '0' (step S400), the CPU 72 adds a specific value Δβ1 to a previous setting of a correction value β (previous β) set in the previous cycle of the downshift target rotation speed updating process to update the correction value β (step S700). The CPU 72 then restricts the updated correction value β to a maximum correction value βmax as an upper limit (step S710) and adds the restricted correction value β to the target rotation speed Ne* of the engine 22, which has been set at step S120 in the drive control routine of FIG. 2, to update the target rotation speed Ne* of the engine 22 (step S720). When the correction value β is not equal to the maximum correction value βmax (step S730), the CPU 72 sets the flag F2 to '1' (step S470) and exits from the modified downshift target rotation speed updating process of FIG. 11. The correction value β is set equal to '0' as an initial value. The maximum correction value βmax is equivalent to the reference value β1 in the downshift target rotation speed updating process of FIG. 7. The specific value Δβ1 represents a degree of increasing the target rotation speed Ne* of the engine 22 in every cycle of the downshift target rotation speed updating process and depends upon the output limit Wout of the battery 50. The specific value Δβ1 is set by taking into account the output limit Wout of the battery 50, because of the following reason. It is assumed that the rotation speed Ne of the engine 22 is raised in the ordinary drive state of the hybrid vehicle 20. The rotation speed Ne of the engine 22 increases with a decrease in torque Tm1 output from the motor MG1. The decrease in output torque Tm1 of the motor MG1 decreases the electric power (Tm1·Nm1) generated by the motor MG1. Part of the electric power to be consumed by the motor MG2 is thus discharged from the battery 50. In order to prevent output of excess electric power from the battery 50, the specific value Δβ1 is set by taking into account the output limit Wout of the battery 50. Setting a maximum possible value to the specific value Δβ1 with consideration of the output limit Wout of the battery 50 enables the driver to promptly have gear change feeling. Each cycle of the downshift target rotation speed updating process gradually increases the correction value β and increases the target rotation speed Ne* of the engine 22. The flag G is set equal to '1' (step S740) when the correction value β reaches the maximum correction value βmax at step S730. The processing flow in the downshift target rotation speed updating process of FIG. 11 under the condition that the flag G is equal to '1' at step S400 is identical with the processing flow in the downshift target rotation speed updating process of FIG. 7 and is not specifically described here. FIG. 12 shows time variations of the vehicle speed V, the gearshift position SP, and the rotation speed Ne of the engine 22 in response to a downshift, for example, from 'S4' to 'S3'. The curve of solid line shows a variation in rotation speed Ne of the engine 22 with setting of the specific value Δβ1 with consideration of the output limit Wout of the battery 50. The curve of broken line shows a variation in rotation speed Ne of the engine 22 with setting of the specific value Δβ1 without consideration of the output limit Wout of the battery 50. When a relatively small value is set to the specific value Δβ1 in response to a downshift at a time t5, the drive control gently varies the target rotation speed Ne* of the engine 22 as shown by the broken line curve. Such drive control does not enable the driver to promptly have gear change feeling. When a maximum possible value is set to the specific value Δβ1 with consideration of the output limit Wout of the battery 50 in response to the downshift at the time t5, on the other hand, the drive control quickly varies the target rotation speed Ne* of the engine 22 as shown by the solid line curve, while preventing the battery 50 from being discharged excessively. This drive control enables the driver to promptly have gear change feeling.

Figure 13:
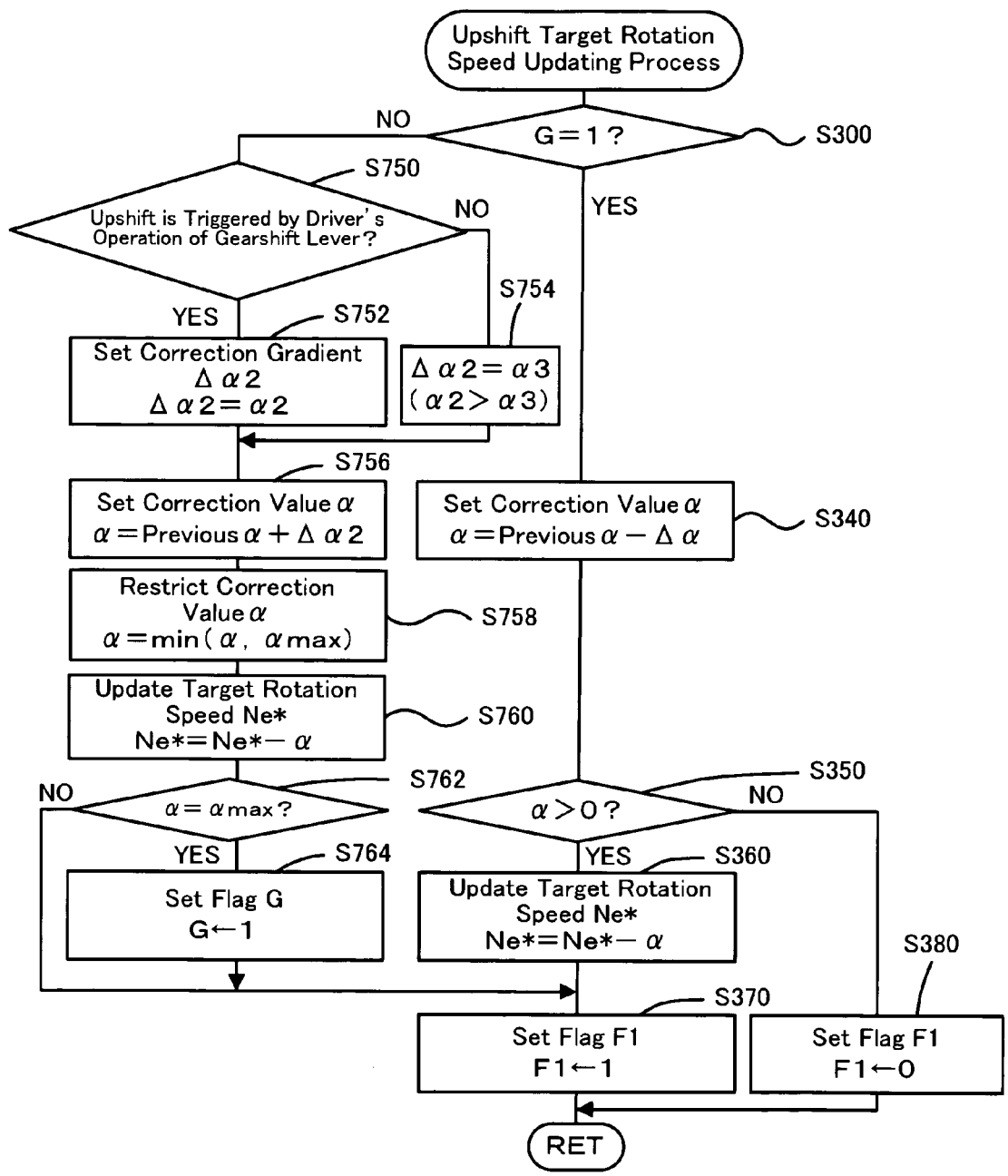
FIG. 13 is a flowchart showing still another modified flow of the upshift target rotation speed updating process executed by the hybrid electronic control unit.
Figure 14:
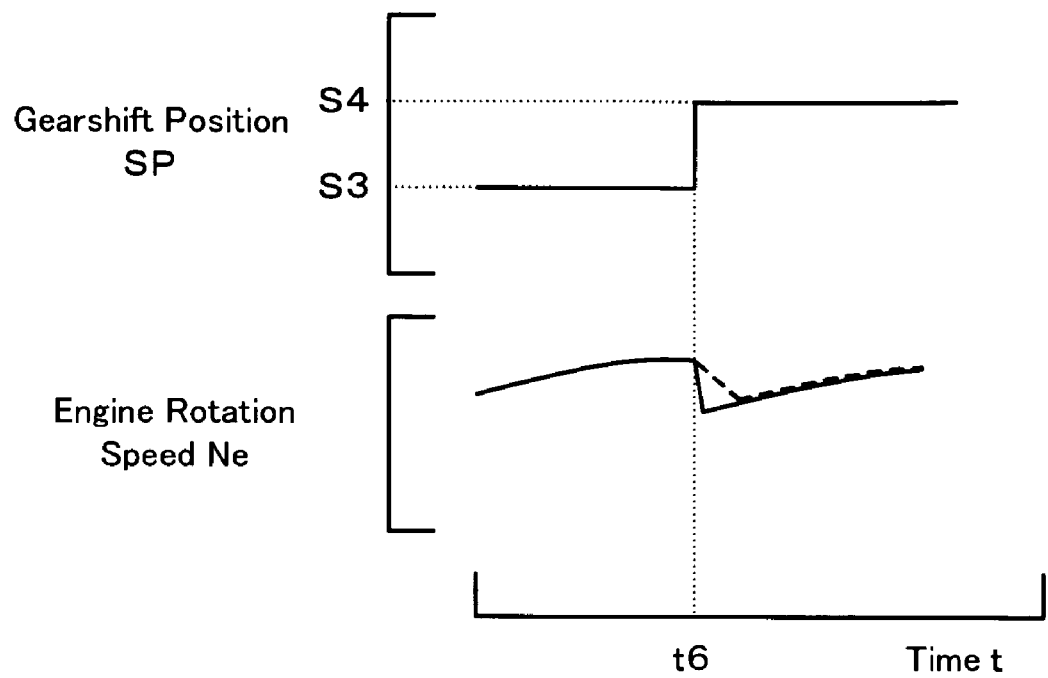
FIG. 14 shows time variations in gearshift position SP and rotation speed Ne of the engine in response to an upshift.

In the hybrid vehicle 20 of the embodiment, the upshift target rotation speed updating process of FIG. 6 changes the target rotation speed Ne* of the engine 22 regardless of whether an upshift is triggered by the driver's operation of the gearshift lever 81 or by changes of the accelerator opening Acc and the vehicle speed V. Another possible modification may change the target rotation speed Ne* of the engine 22 by taking into account the cause of an upshift. The flowchart of FIG. 13 shows a modified flow of the upshift target rotation speed updating process with such consideration. The modified upshift target rotation speed updating process of FIG. 13 is identical with the upshift target rotation speed updating process of FIG. 6, except replacement of steps S310 to S330 by steps S750 to S764. In the modified upshift target rotation speed updating process of FIG. 13, when the flag G is equal to '0' (step S300), the CPU 72 determines whether an upshift is triggered by the driver's operation of the gearshift lever 81 or by changes of the accelerator opening Acc and the vehicle speed V (step S750). When the upshift is ascribed to the driver's operation of the gearshift lever 81 at step S750, the CPU 72 sets a relatively large specific value α2 to a correction gradient Δα2 (step S752) and adds the correction gradient Δα2 to a previous setting of a correction value α (previous α) to update the correction value α (step S756). The CPU 72 then restricts the updated correction value α to a maximum correction value αmax as an upper limit (step S758) and subtracts the restricted correction value α from the target rotation speed Ne* of the engine 22, which has been set at step S120 in the drive control routine of FIG. 2, to update the target rotation speed Ne* of the engine 22 (step S760). When the correction value α is not equal to the maximum correction value αmax (step S762), the CPU 72 sets the flag F1 to '1' (step S370) and exits from the modified upshift target rotation speed updating process of FIG. 13. When the correction value α reaches the maximum correction value αmax (step S762), the CPU 72 successively sets the flags G and F1 to '1' (steps S764 and S370) and exits from the modified upshift target rotation speed updating process of FIG. 13. The correction value α is set equal to '0' as an initial value. The maximum correction value αmax is equivalent to the reference value α1 in the upshift target rotation speed updating process of FIG. 6. When the upshift is triggered by the driver's operation of the gearshift lever 81, the modified drive control lowers the target rotation speed Ne* of the engine 22 with the correction value α updated by addition of the relatively large correction gradient Δα2. This arrangement abruptly decreases the rotation speed Ne of the engine 22 and enables the driver to have adequate gear change feeling. When the upshift is ascribed to the changes of the accelerator opening Acc and the vehicle speed V at step S750, on the other hand, the CPU 72 sets a specific value α3, which is smaller than the specific value α2, to the correction gradient Δα2 (step S754) and executes the processing of and after step S756 as described above. When the gear position is shifted up in the sequential gearshift range according to the accelerator opening Acc and the vehicle speed V without the driver's operation of the gearshift lever 81, the modified drive control lowers the target rotation speed Ne* of the engine 22 with the correction value α updated by addition of the relatively small correction gradient Δα2. This arrangement moderately decreases the rotation speed Ne of the engine 22 and prevents the driver from feeling odd by an unexpected upshift. The specific value α3 set to the correction gradient Δα2 represents such a degree that does not make the driver feel something is wrong. The processing flow in the upshift target rotation speed updating process of FIG. 13 under the condition that the flag G is equal to '1' at step S300 is identical with the processing flow in the upshift target rotation speed updating process of FIG. 6 and is not specifically described here. FIG. 14 shows time variations of the gearshift position SP and the rotation speed Ne of the engine 22 in response to an upshift, for example, from 'S3' to 'S4'. The curve of solid line shows a variation in rotation speed Ne of the engine 22 in response to an upshift triggered by the driver's operation of the gearshift lever 81. The curve of broken line shows a variation in rotation speed Ne of the engine 22 in response to an upshift triggered by the changes of the accelerator opening Acc and the vehicle speed V. The drive control rather abruptly decreases the rotation speed Ne of the engine 22 in response to an upshift triggered by the driver's operation of the gearshift lever 81 at a time t6 as shown by the solid line curve. This enables the driver to have adequate gear change feeling. The drive control rather gently decreases the rotation speed Ne of the engine 22 in response to an upshift triggered by the changes of the accelerator opening Acc and the vehicle speed V at the time t6 without the driver's operation of the gearshift lever 81 as shown by the broken line curve. This prevents the driver from feeling odd by an unexpected upshift. The modification described above with regard to the upshift is also applicable to the downshift. The similar modified flow of the downshift target rotation speed updating process changes the target rotation speed Ne* of the engine 22 with consideration of whether a downshift is triggered by the driver's operation of the gearshift lever 81 or by the changes of the accelerator opening Acc and the vehicle speed V.

Figure 15:
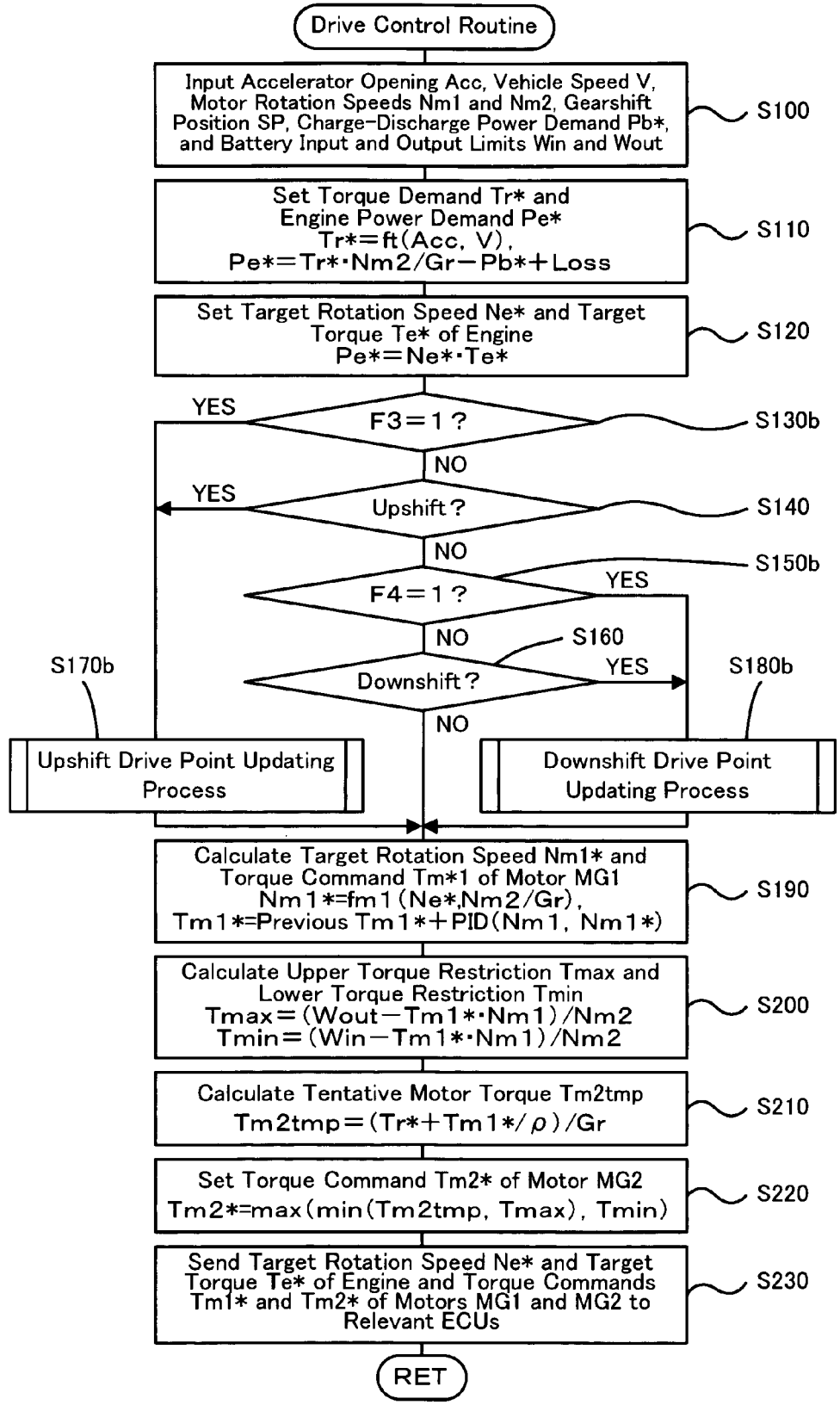
FIG. 15 is a flowchart showing a modified flow of the drive control routine executed by the hybrid electronic control unit.
Figure 16:
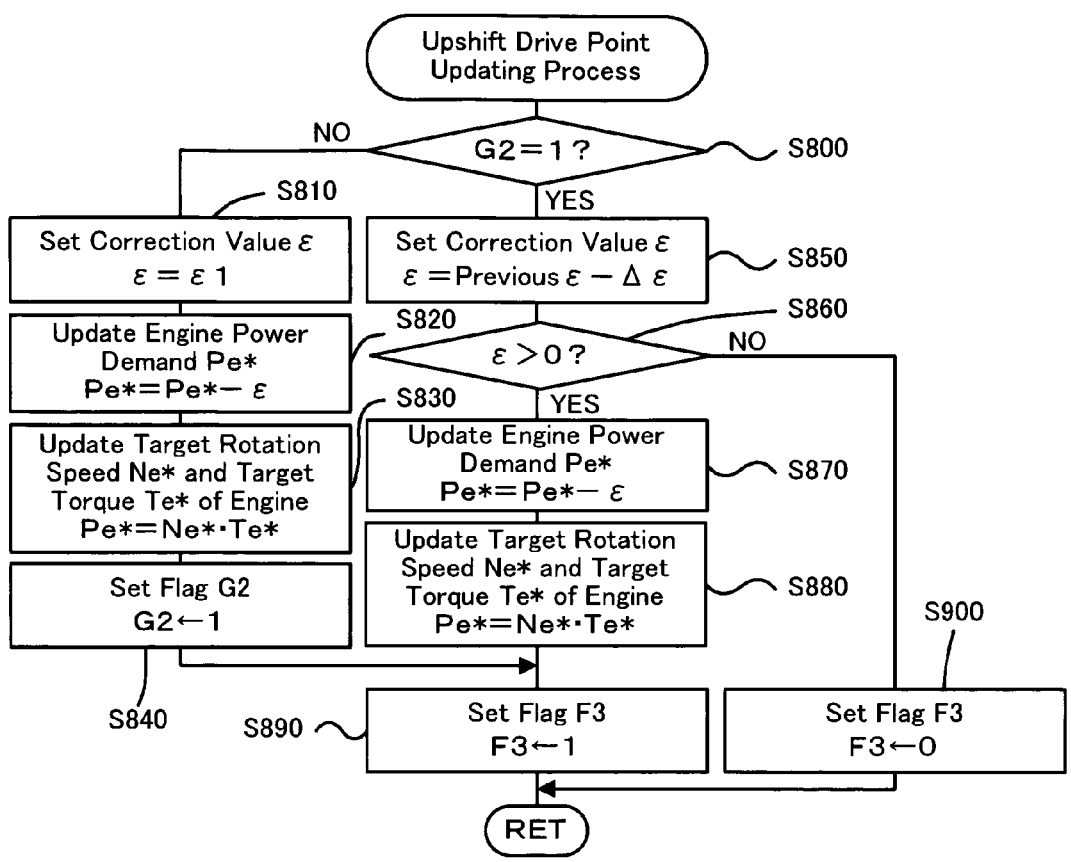
FIG. 16 is a flowchart showing the details of an upshift drive point updating process executed by the hybrid electronic control unit at step S170b in the modified drive control routine of FIG. 15.
Figure 17:
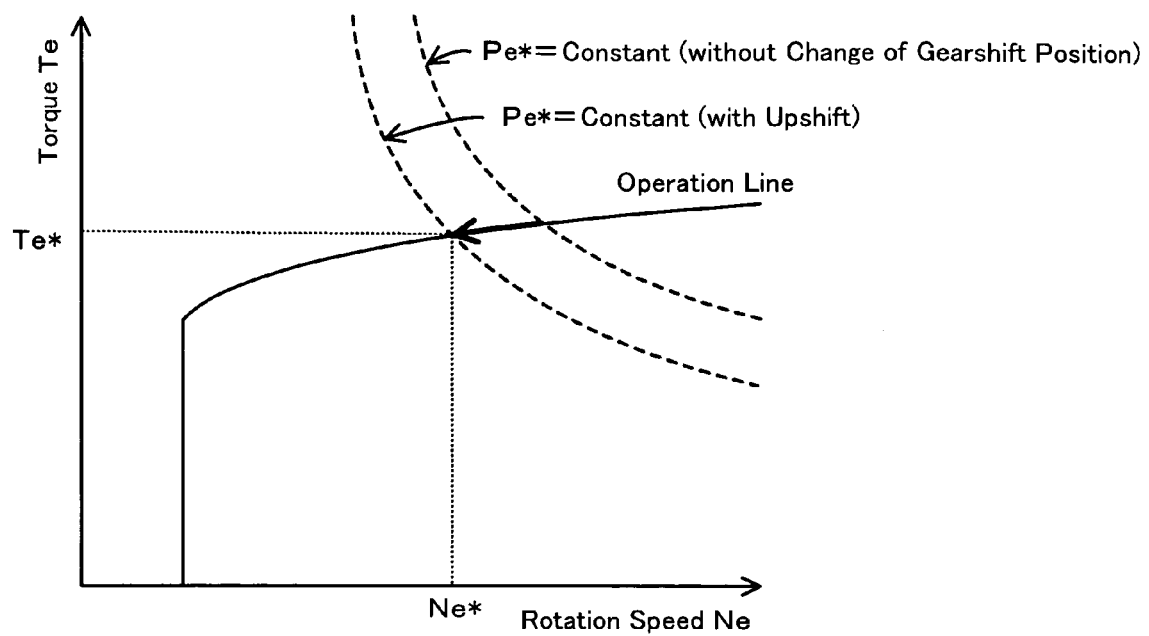
FIG. 17 shows a change of a drive point of the engine in response to an upshift.

In the hybrid vehicle 20 of the embodiment, in response to a change of the gearshift position SP, the drive control executes either the upshift target rotation speed updating process of FIG. 6 or the downshift target rotation speed updating process of FIG. 7 to change only the engine rotation speed from the original engine rotation speed at the drive point with the fixed gearshift position SP. One possible modification may change both the engine rotation speed and the engine torque in response to a change of the gearshift position SP. A processing flow of the drive control routine with such modification is shown in the flowchart of FIG. 15. The modified drive control routine of FIG. 15 is basically identical with the drive control routine of FIG. 2, except replacement of the upshift target rotation speed updating process (steps S170) and the downshift target rotation speed updating process (step S180) with an upshift drive point updating process (step S170b) and a downshift drive point updating process (step S180b). A flag F3 at step S130b in the modified drive control routine of FIG. 15 has an initial value of '0' and is set equal to '1' during execution of the upshift drive point updating process. Similarly a flag F4 at step S150b has an initial value of '0' and is set equal to '1' during execution of the downshift drive point updating process. In the modified drive control routine of FIG. 15, in response to identification of an upshift at step S140, the CPU 72 executes the upshift drive point updating process (step S170b). A next cycle of the modified drive control routine gives an affirmative answer at step S130b representing execution of the upshift drive point updating process and goes to step S170b for continued execution of the upshift drive point updating process. In response to identification of a downshift at step S160, on the other hand, the CPU 72 executes the downshift drive point updating process (step S180b). A next cycle of the modified drive control routine gives an affirmative answer at step S150b representing execution of the downshift drive point updating process and goes to step S180b for continued execution of the downshift drive point updating process. As an example, the details of the upshift drive point updating process are described briefly with reference to the flowchart of FIG. 16. In the upshift drive point updating process of FIG. 16, the CPU 72 first identifies a flag G2 representing a change of the drive point of the engine 22 (step S800). When the flag G2 is equal to '0' at step S800, the CPU 72 sets a predetermined reference value $\epsilon 1$ to a correction value $\epsilon$ (step S810) and subtracts the correction value $\epsilon$ from the engine power demand Pe* set at step S110 in the modified drive control routine of FIG. 15 to update the engine power demand Pe* (step S820). The reference value $\epsilon 1$ depends upon the characteristics of the engine 22. The CPU 72 then refers to an efficient operation line of the engine 22 and a curve of the updated engine power demand Pe* to update the target rotation speed Ne* and the target torque Te* of the engine 22 (step S830). The CPU 72 successively sets the flags G2 and the flag F3 equal to '1' (steps S840 and S890) and terminates the upshift drive point updating process. FIG. 17 shows a change of the drive point of the engine 22 in response to an upshift. As illustrated, in response to an upshift, the drive control decreases both the target rotation speed Ne* and the target torque Te* of the engine 22 to change the drive point. This enables the driver to have adequate gear change feeling. The decreased target torque Te* of the engine 22 naturally decreases a portion of the output torque Te* of the engine 22, which is directly transmitted to the ring gear shaft 32a (hereafter referred to as 'directly transmitted torque'). The motor MG2 is controlled to compensate for the decrease of the directly transmitted torque in the range of the output limit Wout of the battery 50. Such compensation desirably relieves a potential shock due to the decrease in engine torque output to the ring gear shaft 32a connected to the axle 36. In order to give the enhanced gear change feeling to the driver, however, the motor MG2 may not compensate for the decrease in engine torque output to the ring gear shaft 32a. When the flag G2 is equal to '1' at step S800, on the other hand, the CPU 72 subtracts a preset value $\Delta\epsilon$ from a previous setting of the correction value $\epsilon$ (previous $\epsilon$), which has been set in the previous cycle of the upshift drive point updating process, to update the correction value $\epsilon$ (step S850) and checks the correction value $\epsilon$ (step S860). When the correction value $\epsilon$ is positive, the CPU 72 updates the engine power demand Pe* and accordingly the target rotation speed Ne* and the target torque Te* of the engine 22 (steps S870 and S880) in the same manner as steps S820 and S830, sets the flag F3 equal to '1' (step S890), and terminates the upshift drive point updating process. The repeated execution of the upshift drive point updating process gradually decreases the correction value $\epsilon$ and makes the engine power demand Pe* with the upshift gradually approach to the engine power demand Pe* without a change of the gearshift position SP. When the correction value $\epsilon$ becomes equal to or less than '0' (step S860), the CPU 72 sets the flag F3 equal to '0' (step S900) and terminates the upshift drive point updating process without updating the target rotation speed Ne* and the target torque Te* of the engine 22. In response to identification of a downshift at step S160 in the modified drive control routine of FIG. 15, the engine power demand Pe* is increased to change the drive point. This also enables the driver to have adequate gear change feeling.

Figure 18:
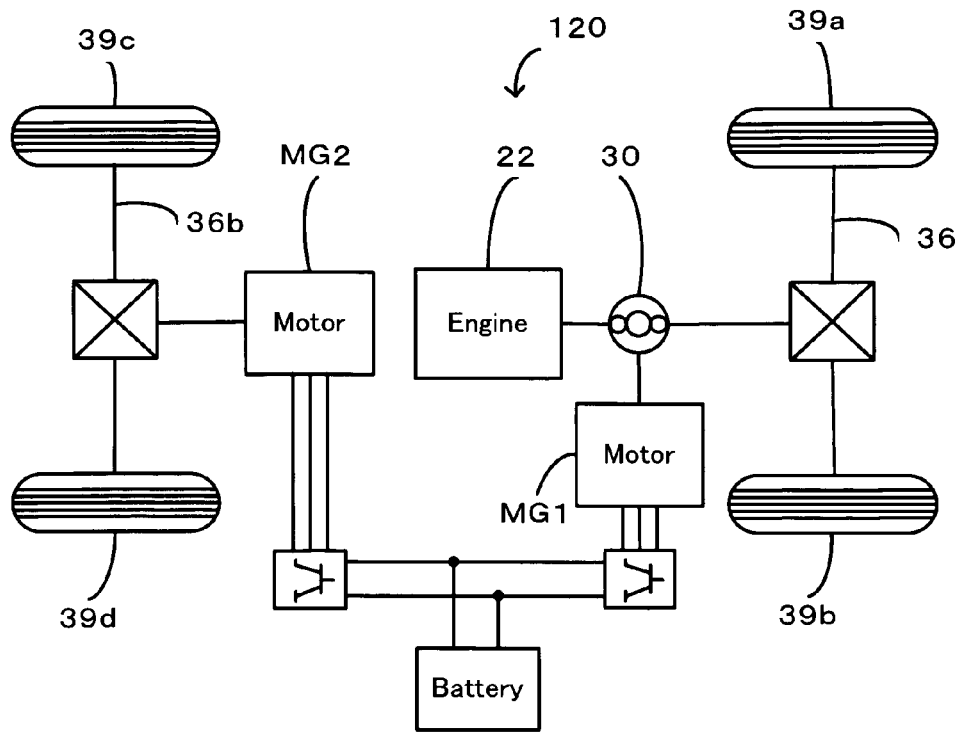
FIG. 18 schematically illustrates the configuration of another hybrid vehicle as one modified example.

In the hybrid vehicle 20 of the embodiment, the power of the motor MG2 is output to the axle 36 linked with the drive wheels 39a and 39b. The principle of the invention is also applicable to a hybrid vehicle 120 of one modified example shown in FIG. 18, where the power of the motor MG2 is output to an axle 36b linked with drive wheels 39c and 39d, which are different from the drive wheels 39a and 39b.

Figure 19:
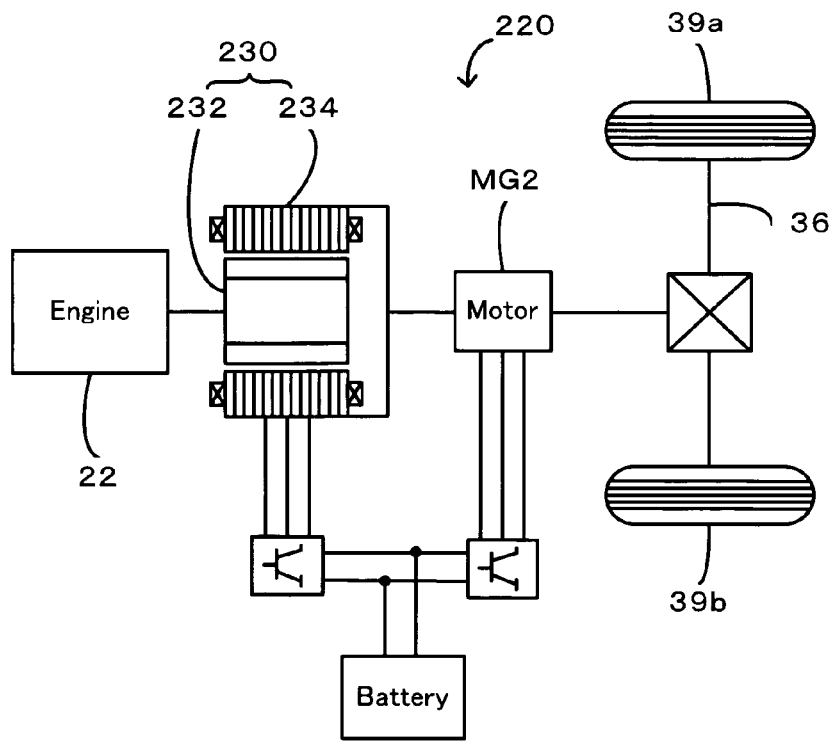
FIG. 19 schematically illustrates the configuration of still another hybrid vehicle as another modified example.

In the hybrid vehicle 20 of the embodiment, the power of the engine 22 is output via the power distribution integration mechanism 30 to the axle 36 linked with the drive wheels 39a and 39b. The principle of the invention is also applicable to a hybrid vehicle 220 of another modified example shown in FIG. 19, which is equipped with a pair-rotor motor 230. The pair-rotor motor 230 includes an inner rotor 232 connected to the crankshaft 26 of the engine 22 and an outer rotor 234 connected to the axle 36 linked with the drive wheels 39a and 39b. The pair-rotor motor 230 transmits part of the output power of the engine 22 to the drive wheels 39a and 39b, while converting the residual engine output power into electric power.

Figure 20:
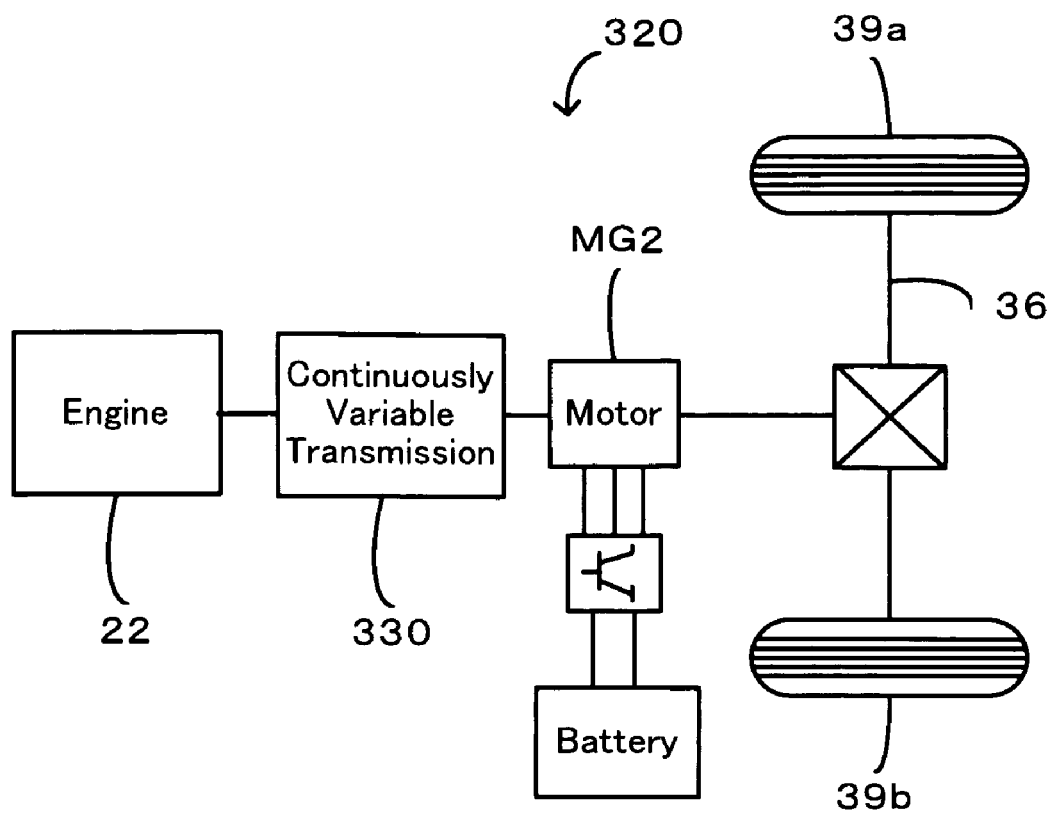
FIG. 20 schematically illustrates the configuration of another hybrid vehicle as still another modified example.

In the hybrid vehicle 20 of the embodiment, the power of the engine 22 is output via the power distribution integration mechanism 30 to the axle 36 linked with the drive wheels 39a and 39b. The principle of the invention is also applicable to a hybrid vehicle 320 of another modified example shown in FIG. 20, where the power of the engine 22 is output via a continuously variable transmission 330 to the axle 36 linked with the drive wheels 39a and 39b.

The embodiments and their modified examples discussed above are to be considered in all aspects as illustrative and not restrictive. There may be many other modifications, changes, and alterations without departing from the scope or spirit of the main characteristics of the present invention.

The disclosure of Japanese Patent Applications No. 2005-243952 filed Aug. 25, 2005 and No. 2005-39126 filed Feb. 16, 2005 including specification, drawings and claims are incorporated herein by reference in their entirety.

What is claimed is:

1. A electronic control unit for controlling a sequential gearshift range of a motor vehicle equipped with an internal combustion engine, a power transmission assembly, and a motor, where the power transmission assembly transmits at least part of output power of the internal combustion engine, which is driven at an arbitrary drive point regardless of a gearshift position, to an axle and the motor is capable of outputting power to the axle, said electronic control unit comprising:
  a driving force demand setting module that sets a driving force demand to be output to the axle;
  an effective drive point setting module that,
    in the case of no change of the gearshift position, sets an effective drive point to a specific drive point determined under a preset restriction according to the driving force demand, and
    in the case of a change of the gearshift position, sets the effective drive point to an updated drive point with at least a change of a rotation speed of the internal combustion engine from the specific drive point determined under the preset restriction according to the driving force demand; and
  a control module that controls the internal combustion engine, the power transmission assembly, and the motor to drive the internal combustion engine at the set effective drive point and to ensure output of a driving force equivalent to the driving force demand to the axle.

2. A electronic control unit in accordance with claim 1, said motor vehicle further comprising:
  a gearshift position change mechanism that changes the gearshift position according to a driver's depression amount of an accelerator pedal and a vehicle speed.

3. A electronic control unit in accordance with claim 2, wherein the gearshift position change mechanism changes the gearshift position according to the vehicle speed when the driver depresses the accelerator pedal to or over a preset first level.

4. A electronic control unit in accordance with claim 1, said motor vehicle further comprising:
  a first gearshift position change mechanism that changes the gearshift position by a driver's gearshift position change operation; and
  a second gearshift position change mechanism that changes the gearshift position according to the driver's depression amount of an accelerator pedal and a vehicle speed regardless of the driver's gearshift position change operation,
  wherein said effective drive point setting module, in response to a change of the gearshift position by the first gearshift position change mechanism, sets the effective drive point to an updated drive point with at least a change of the rotation speed to a first speed from the specific drive point determined under the preset restriction according to the driving force demand, and in response to a change of the gearshift position by the second gearshift position change mechanism, sets the effective drive point to an updated drive point with at least a change of the rotation speed to a second speed, which is different from the first speed, from the specific drive point determined under the preset restriction according to the driving force demand.

5. A electronic control unit in accordance with claim 4, wherein the second speed is lower than the first speed.

6. A electronic control unit in accordance with claim 1, wherein said effective drive point setting module, in response to a change of the gearshift position, sets the effective drive point to an updated drive point with at least a change of the rotation speed corresponding to the changed gearshift position from the specific drive point determined under the preset restriction according to the driving force demand.

7. A electronic control unit in accordance with claim 1, wherein said effective drive point setting module, in response to an upshift of the gearshift position, sets the effective drive point to an updated drive point with a decrease of the rotation speed from the specific drive point determined under the preset restriction according to the driving force demand.

8. A electronic control unit in accordance with claim 7, wherein said effective drive point setting module, in response to the upshift of the gearshift position, limits a maximum rotation speed of the internal combustion engine and sets the effective drive point to an updated drive point with a decrease of the rotation speed within the restricted maximum rotation speed of the internal combustion engine from the specific drive point determined under the preset restriction according to the driving force demand.

9. A electronic control unit in accordance with claim 1, wherein said effective drive point setting module, in response to a downshift of the gearshift position, sets the effective drive point to an updated drive point with an increase of the rotation speed from the specific drive point determined under the preset restriction according to the driving force demand.

10. A electronic control unit in accordance with claim 1, wherein said effective drive point setting module sets the effective drive point to gradually approach to the specific drive point determined under the preset restriction according to the driving force demand, with elapse of time since the change of the gearshift position.

11. A electronic control unit in accordance with claim 1, said motor vehicle further comprising:
  an accumulator unit that is capable of inputting and outputting electric power from and to the power transmission assembly and the motor,
  wherein the power transmission assembly comprises an electric power-mechanical power input output mechanism that is connected to the internal combustion engine and to the axle and outputs at least part of the output power of the internal combustion engine to the axle through input and output of electric power and mechanical power.

12. A electronic control unit in accordance with claim 11, wherein said effective drive point setting module, in response to an upshift of the gearshift position, sets the effective drive point to an updated drive point with a decrease of the rotation speed, which is lowered by a preset value corresponding to a first variation level within an input limit of the accumulator unit, from the specific drive point determined under the preset restriction according to the driving force demand.

13. A electronic control unit in accordance with claim 11, wherein said effective drive point setting module, in response to a downshift of the gearshift position, sets the effective drive point to an updated drive point with an increase of the rotation speed, which is raised by a preset value corresponding to a second variation level within an output limit of the accumulator unit, from the specific drive point determined under the preset restriction according to the driving force demand.

14. A electronic control unit in accordance with claim 1, wherein the power transmission assembly is a continuously variable transmission.

15. A control method of controlling a sequential gearshift range executed by a electronic control unit of a motor vehicle equipped with an internal combustion engine, a power transmission assembly, and a motor, where the power transmission assembly transmits at least part of output power of the internal combustion engine, which is driven at an arbitrary drive point regardless of a gearshift position, to an axle and the motor is capable of outputting power to the axle, said control method comprising the steps of:
(a) in the case of no change of the gearshift position, setting an effective drive point to a specific drive point determined under a preset restriction according to a driving force demand specified as a requirement to be output to the axle and controlling the internal combustion engine, the power transmission assembly, and the motor to drive the internal combustion engine at the set effective drive point and to ensure output of a driving force equivalent to the driving force demand to the axle; and
(b) in the case of a change of the gearshift position, setting the effective drive point to an updated drive point with at least a change of a rotation speed of the internal combustion engine from the specific drive point determined under the preset restriction according to the driving force demands; and
(c) controlling the internal combustion engine, the power transmission assembly, and the motor to drive the internal combustion engine at the set effective drive point and to ensure output of a driving force equivalent to the driving force demand to the axle.

16. A electronic control unit control method in accordance with claim 15, wherein said step (b), in response to a change of the gearshift position by a driver's gearshift position change operation, sets the effective drive point to an updated drive point with at least a change of the rotation speed to a first speed from the specific drive point determined under the preset restriction according to the driving force demand, and in response to a change of the gearshift position according to the driver's depression amount of an accelerator pedal and a vehicle speed regardless of the driver's gearshift position change operation, sets the effective drive point to an updated drive point with at least a change of the rotation speed to a second speed, which is different from the first speed, from the specific drive point determined under the preset restriction according to the driving force demand.

17. A electronic control unit control method in accordance with claim 15, wherein said step (b), in response to an upshift of the gearshift position, sets the effective drive point to an updated drive point with a decrease of the rotation speed from the specific drive point determined under the preset restriction according to the driving force demand.

18. A electronic control unit control method in accordance with claim 15, wherein said step (b), in response to a downshift of the gearshift position, sets the effective drive point to an updated drive point with an increase of the rotation speed from the specific drive point determined under the preset restriction according to the driving force demand.

19. A electronic control unit control method in accordance with claim 15, wherein said step (b) sets the effective drive point to gradually approach to the specific drive point determined under the preset restriction according to the driving force demand, with elapse of time since the change of the gearshift position.

20. A electronic control unit for controlling a sequential gearshift range of a motor vehicle equipped with an internal combustion engine, a power transmission assembly, and a motor, where the power transmission assembly transmits at least part of output power of the internal combustion engine, which is driven at an arbitrary drive point regardless of a gearshift position, to an axle and the motor is capable of outputting power to the axle, said electronic control unit comprising:
a driving force demand setting module that sets a driving force demand to be output to the axle;
an effective drive point setting module that,
in the case of no change of the gearshift position, sets an effective drive point to a specific drive point determined under a preset restriction according to the driving force demand, and
in the case of an upshift of the gearshift position, sets the effective drive point to an updated drive point with at least a decrease of a rotation speed of the internal combustion engine from the specific drive point determined under the preset restriction according to the driving force demand; and
a control module that controls the internal combustion engine, the power transmission assembly, and the motor to drive the internal combustion engine at the set effective drive point and to ensure output of a driving force equivalent to the driving force demand to the axle.

21. A electronic control unit for controlling a sequential gearshift range of a motor vehicle equipped with an internal combustion engine, a power transmission assembly, and a motor, where the power transmission assembly transmits at least part of output power of the internal combustion engine, which is driven at an arbitrary drive point regardless of a gearshift position, to an axle and the motor is capable of outputting power to the axle, said electronic control unit comprising:
a driving force demand setting module that sets a driving force demand to be output to the axle;
an effective drive point setting module that,
in the case of no change of the gearshift position, sets an effective drive point to a specific drive point determined under a preset restriction according to the driving force demand, and
in the case of a downshift of the gearshift position, sets the effective drive point to an updated drive point with at least an increase of a rotation speed of the internal combustion engine from the specific drive point determined under the preset restriction according to the driving force demand; and
a control module that controls the internal combustion engine, the power transmission assembly, and the motor to drive the internal combustion engine at the set effective drive point and to ensure output of a driving force equivalent to the driving force demand to the axle.

* * * * *

UNITED STATES PATENT AND TRADEMARK OFFICE
CERTIFICATE OF CORRECTION

PATENT NO. : 7,460,943 B2
APPLICATION NO. : 11/352305
DATED : December 2, 2008
INVENTOR(S) : Koji Yamamoto et al.

It is certified that error appears in the above-identified patent and that said Letters Patent is hereby corrected as shown below:

Column 15, line 65, "(previous a)" should be changed to --(previous $\alpha$)--;

Lines 4 - 7 of column 21 should be moved to immediately follow line 19 of column 1 as a new paragraph.

Claim 1 Column 21, line 9, "A electronic control unit" should be changed to --An electronic control unit--;
Claim 2 Column 21, line 36, "A electronic control unit" should be changed to --An electronic control unit--;
Claim 3 Column 21, line 41, "A electronic control unit" should be changed to --An electronic control unit--;
Claim 4 Column 21, line 46, "A electronic control unit" should be changed to --An electronic control unit--;
Claim 5 Column 22, line 3, "A electronic control unit" should be changed to --An electronic control unit--;
Claim 6 Column 22, line 5, "A electronic control unit" should be changed to --An electronic control unit--;
Claim 7 Column 22, line 12, "A electronic control unit" should be changed to --An electronic control unit--;
Claim 8 Column 22, line 18, "A electronic control unit" should be changed to --An electronic control unit--;
Claim 9 Column 22, line 27, "A electronic control unit" should be changed to --An electronic control unit--;
Claim 10 Column 22, line 33, "A electronic control unit" should be changed to --An electronic control unit--;
Claim 11 Column 22, line 40, "A electronic control unit" should be changed to --An electronic control unit--;
Claim 12 Column 22, line 52, "A electronic control unit" should be changed to --An electronic control unit--;
Claim 13 Column 22, line 60, "A electronic control unit" should be changed to --An electronic control unit--;

Signed and Sealed this

Twenty-fifth Day of May, 2010

David J. Kappos
*Director of the United States Patent and Trademark Office*

CERTIFICATE OF CORRECTION (continued)
U.S. Pat. No. 7,460,943 B2

Claim 14 Column 23, line 1, "A electronic control unit" should be changed to --An electronic control unit--;
Claim 15 Column 23, line 5, "a electronic control unit" should be changed to --an electronic control unit--;
Claim 16 Column 23, line 33, "A electronic control unit" should be changed to --An electronic control unit--;
Claim 17 Column 23, line 48, "A electronic control unit" should be changed to --An electronic control unit--;
Claim 18 Column 23, line 54, "A electronic control unit" should be changed to --An electronic control unit--;
Claim 19 Column 23, line 60, "A electronic control unit" should be changed to --An electronic control unit--;
Claim 20 Column 24, line 5, "A electronic control unit" should be changed to --An electronic control unit--; and
Claim 21 Column 24, line 32, "A electronic control unit" should be changed to --An electronic control unit--.